US010493571B1

(12) United States Patent
Kostecki

(10) Patent No.: US 10,493,571 B1
(45) Date of Patent: Dec. 3, 2019

(54) FUSED OVERLAY PLATE AND METHOD

(71) Applicant: Andrew Kostecki, Mooresville, NC (US)

(72) Inventor: Andrew Kostecki, Mooresville, NC (US)

(*) Notice: Subject to any disclaimer, the term of this patent is extended or adjusted under 35 U.S.C. 154(b) by 0 days.

(21) Appl. No.: 16/359,588

(22) Filed: Mar. 20, 2019

Related U.S. Application Data

(60) Provisional application No. 62/732,041, filed on Sep. 17, 2018.

(51) Int. Cl.
*B23K 37/04* (2006.01)
*B23K 9/04* (2006.01)
*H01R 4/48* (2006.01)
*B23K 37/00* (2006.01)

(52) U.S. Cl.
CPC .......... *B23K 37/0408* (2013.01); *B23K 9/042* (2013.01); *B23K 37/003* (2013.01); *H01R 4/4809* (2013.01)

(58) Field of Classification Search
CPC .. B23K 9/042; B23K 37/0408; B23K 27/003; H01R 4/4809
See application file for complete search history.

(56) References Cited

U.S. PATENT DOCUMENTS

| | | | | |
|---|---|---|---|---|
| 2,474,534 A | * | 6/1949 | Knost | B23K 11/36 191/1 R |
| 2,603,457 A | * | 7/1952 | Bishop | B29C 33/044 165/89 |
| 3,514,961 A | * | 6/1970 | Shuttleworth | E21D 23/20 405/293 |
| 5,362,937 A | * | 11/1994 | Browne | B23K 9/042 219/125.12 |
| 6,854,808 B2 | | 2/2005 | Kostecki | |
| 2005/0126056 A1 | | 6/2005 | Kostecki | |
| 2007/0164002 A1 | | 7/2007 | Scandella et al. | |
| 2008/0169335 A1 | * | 7/2008 | Aarnio | B23K 9/0256 228/176 |
| 2009/0045035 A1 | * | 2/2009 | Helgerson | B65G 13/07 198/781.01 |
| 2010/0326963 A1 | * | 12/2010 | Peters | B23K 9/04 219/76.14 |
| 2011/0038974 A1 | * | 2/2011 | Schroder | B82Y 30/00 425/78 |
| 2012/0006520 A1 | * | 1/2012 | Sferlazzo | C23C 14/50 165/185 |

(Continued)

FOREIGN PATENT DOCUMENTS

JP 2000326173 A * 11/2000

OTHER PUBLICATIONS

Machine translation of Japan Patent No. 2000326173A, Jul. 2019.*

(Continued)

Primary Examiner — Geoffrey S Evans
(74) Attorney, Agent, or Firm — Tuggle Duggins P.A.; Blake P. Hurt

(57) ABSTRACT

An electronically controlled apparatus for the manufacture of fused overlay plate including a conveyor assembly, a ground assembly, two hopper assemblies, a number of wire feeder assemblies, and a perforated cooling drum to produce a metal plate with a fused weld overlay that is harder, more impact resistant, and demonstrates a longer lifespan with respect to abrasion than known in the prior art.

130 Claims, 20 Drawing Sheets

(56) References Cited

U.S. PATENT DOCUMENTS

| | | | |
|---|---|---|---|
| 2012/0325779 A1 | 12/2012 | Yelistratov | |
| 2013/0001175 A1* | 1/2013 | Urban | B01D 21/262 |
| | | | 210/783 |
| 2013/0273394 A1* | 10/2013 | Sheu | B21B 1/227 |
| | | | 428/687 |
| 2017/0137229 A1* | 5/2017 | DeVries | B65G 15/64 |
| 2017/0368637 A1* | 12/2017 | Giese | B23K 26/211 |

OTHER PUBLICATIONS webpage printout from: https://www.welding-alloys.com/EN/products-services/welding-alloys-machines/automation/stationary-multisurfacer/rotary-plate-cladder.html, showing Rotary Plate Cladder machine of Welding Alloys Group, undated, print date Oct. 8, 2019.

webpage printout from: https://www.cliftonsteel.com/chute-liners, showing Chute Liners, Wear & Impact Resistant Steel of Clifton Steel Company, copyright 2019, print date Oct. 8, 2019.

webpage printout from: https://wwwjadcomfg.com/corporate, showing QT-PLUS® wear steel of JADCO Manufacturing Inc., copyright 2019, print date Oct. 8, 2019.

webpage printout from: http://www.sasglobalcorp.com/about.html, showing the about page of SAS Global Corporation, copyright 2013-2017, print date Oct. 8, 2019.

webpage printout from: https://www.ssab.com/products/brands/hardox, showing the home page of SSAB, copyright 2019, print date Oct. 8, 2019.

webpage printout from: http://www.wearcon.com/products/wear-plates, showing various wear plates of Wear Concepts, Inc., undated, print date Oct. 8, 2019.

webpage printout from: https://www.alabamahardsurfacing.com/, showing a chromium carbide overlay wear and abrasion resistant plate of Alabama Hard Surfacing, Inc., copyright 2017, print date Oct. 8, 2019.

webpage printout from: https://wearco.com.au/products/wear-plate/, showing Chromium Carbide Wear Plate of WEARCO NSW Pty Ltd, copyright 2016, print date Oct. 8, 2019.

webpage printout from: https://www.tassco.com/, showing the home page of TASSCO Total Alloy Steel Service Company, undated, print date Oct. 8, 2019.

webpage printout from: https://bradken.com/, showing the home page of Bradken Pty Limited, undated, print date Oct. 8, 2019.

webpage printout from: http://hardsteel.com/, showing the about page of HardSteel, Inc., undated, print date Oct. 8, 2019.

webpage printout from: https://www.bisalloy.com.au/aboutbisalloy.aspx, showing the about page of Bisalloy, copyright 2019, print date Oct. 8, 2019.

\* cited by examiner

FUSED OVERLAY PLATE AND METHOD

This non-provisional patent application claims all benefits under 35 U.S.C. § 119(e) of U.S. provisional patent application Ser. No. 62/732,041 filed 17 Sep. 2018, entitled "METAL-FUSION-OVERLAY PROCESS", in the United States Patent and Trademark Office, which is incorporated by reference in its entirety herein.

FIELD OF THE INVENTION

The invention herein pertains to a system and method of overlaying weld metal of metal plates and particularly pertains to an improved apparatus and method of overlaying metal plates with a thermally fused flux media and a variety of adjustable components controlled by a computer control system to achieve enhanced plate performance metrics such as hardness and impact resistance.

DESCRIPTION OF THE PRIOR ART AND OBJECTIVES OF THE INVENTION

Overlaying of weld metal on metal plates and other implements is well known in the art, particularly in industries such as agriculture, mining, and commercial vehicles. In short, the process involves covering, enveloping, or otherwise coating a metal base with another substance and then adhering the substance to the face of the plate to imbue said face with certain desirable characteristics. See for example the world's only smooth metal plate overlay system and method described in U.S. Pat. No. 5,362,937 granted 8 Nov. 1994 entitled OVERLAYING OF PLATES, assigned to Gene Kostecki, the father of the applicant of the subject application, the entire disclosure of which is hereby incorporated by reference. One method of overlaying plates is to form a plate into a cylinder and then to fit this cylinder into a machine so as to rotate the cylinder beneath an array of welding heads positioned to deposit a layer of welding material onto the plates progressively as it is rotated until the entire surface of the plates in its cylindrical form is covered, after which the plate is cut and straightened to produce the hard faced sheet of material. A problem in such an arrangement is first that considerable work is entailed in forming the plates into a cylindrical form and then to straighten the plates into the form in which they will be used during the manufacture of products. Certain difficulties also exist in control of the welding because of the cylindrical form of the plate at the time the welding material was applied by the heads. It is also a practical restriction on the size of a plate which can be welded by such a method. Another problem that exists with weld overlaying is that in the sheet material some portions of the sheet are heated more than others because two welding heads pass over the same area and this gives an uneven thickness of weld metal overlay and perhaps some change to the metallurgical structure of the underlying metal. Fortunately, development in computer controllers, programmable logic, and computer numerical control (CNC) has vastly improved the manufacture of hardened metal members, decreasing variation between product batches and increasing quality outputs. However, there still exists a need for a system and method of applying weld metal to form an overlay on the plate while the plate is in planar form, with particular emphasis on maintaining the planar nature of the plate when it is cooled after fusing the flux media to the plate.

Thus, in view of the problems and disadvantages associated with prior art plates and methods of production, the present invention was conceived and one of its objectives is to provide a metal fusion plate and method of manufacture that maintains the cladded plate in a substantially planar configuration, even during cooling.

It is another objective of the present invention to provide a metal fusion plate and method of manufacture that includes a drive camber roller to interface with apertures formed at the sides of the base metal plate to drive the plate through the cladding process and maintain it in a planar configuration.

It is still another objective of the present invention to provide a metal fusion plate and method of manufacture with an adjustable conveyor sliding apparatus configured to accommodate convex cambered feeder rolls and a variety of plate thicknesses as desirable.

It is yet another objective of the present invention to provide a metal fusion plate and method of manufacture comprising a variable, spring-loaded ground (earth) apparatus with tensioned feet configured to contact the metal plate to provide direct grounding during the cladding process.

It is a further objective of the present invention to provide a metal fusion plate and method of manufacture configured to accommodate up to an eight (8) foot by twenty (20) foot metal plate during the cladding process.

It is still a further objective of the present invention to provide a metal fusion plate and method of manufacture including a first screening box or hopper connected with a raking apparatus, whereby the assembly is vertically adjustable to accommodate the thickness of the plate to be clad as desirable, and whereby the apparatus maintains a uniform thickness of a first media such as a metal powder in preparation for fusion with the base metal plate.

It is yet a further objective of the present invention to provide a metal fusion plate and method of manufacture comprising a second screening box or hopper connected with a raking apparatus (either the one described above or an independent device), the assembly vertically adjustable to accommodate the thickness of the plate to be clad as desirable, and whereby the apparatus maintains a uniform thickness of a second media such as an insulating powder in preparation for fusion with the base metal plate.

It is another objective of the present invention to provide a metal fusion plate and method of manufacture including a plurality of metal thermal fusion power heads, spaced approximately four inches apart, each head further comprising a gear-driven, individual filler-metal feed unit that is liquid- or gas-cooled and that supplies electrical current to a power head which supplies voltage and current through insulating element(s), continuing through the metal powder to contact the metal base plate, and in so doing creates a metallurgical fusion bonding. Each power head is individually controlled in a transverse "scissor" horizontal motion with an oscillating backward/forward of the forward indexing motion of the base metal plate in a multi-axis movement pattern designed to form a variety of fusion weld patterns as may be desirable.

It is still another objective of the present invention to provide a metal fusion plate and method of manufacture having one or more internally plumbed, perforated spray bars following the thermal bonding process to cool the cladded plate underside.

It is a further objective of the present invention to provide a metal fusion plate and method of manufacture configured with liquid- or gas-cooled thermal support and cleaning rollers to break the thermal insulation element(s) for discharge cleaning and orienting the cladded plate into the cooling and biased straightening rollers to ensure the finished plate remains planar.

It is still a further objective of the present invention to provide a metal fusion plate and method of manufacture produced by a submerged arch welding technique.

It is yet a further objective of the present invention to provide a metal fusion plate and method of manufacture with a reduced coefficient of friction, an increased hardness score, and extended durability, particularly in view of impact rating, while being produced in consistent batches plate-to-plate.

Various other objectives and advantages of the present invention will become apparent to those skilled in the art as a more detailed description is set forth below.

SUMMARY OF THE INVENTION

The aforesaid and other objectives are realized by providing an apparatus configured to produce fused overlay plates and a method of their manufacture. The apparatus includes electronic control logic and sensors in communication with a vertically adjustable conveyor member configured to accommodate convex cambered feeder rolls and a variety of plate thicknesses as desirable, the conveyor responsible for maintaining the metal plate in a planar orientation by virtue of a cambered drive roller to interface with apertures formed at the sides of the base metal plate to drive the plate through the cladding process. A variable spring-loaded ground (earth) assembly with tensioned feet is configured to contact the metal plate to provide direct grounding. The apparatus includes two hoppers or boxes: a first hopper connected with a raking apparatus, whereby the assembly is vertically adjustable to accommodate the thickness of the plate to be clad as desirable, and whereby the apparatus maintains a uniform thickness of a first media such as a metal powder in preparation for fusion with the base metal plate; and a second hopper connected with the raking apparatus, whereby the assembly is vertically adjustable to accommodate the thickness of the plate to be clad as desirable, and whereby the apparatus maintains a uniform thickness of a second media such as an insulating powder in preparation for fusion with the base metal plate. The apparatus further includes twenty-four (24) metal thermal fusion wire feeder assemblies with power heads spaced approximately four inches apart, each power head further comprising a gear-driven, individual filler-metal feed unit that is liquid- or gas-cooled and that supplies electrical current to the power head which supplies voltage and current through insulating element(s), continuing through the metal powder to contact the metal base plate, and in so doing creates a metallurgical fusion bonding. Each power head is individually controlled and every other power head is configured to permit a transverse "scissor" horizontal motion with an oscillating backward/forward of the forward indexing motion of the base metal plate in a multi-axis movement pattern designed to form a variety of weld patterns as may be desirable. The metal plate is passed along the conveyor over, between, and/or among a battery of sensors that feedback data instantaneously to the electronic control logic, which in turn can make instantaneous changes to the manufacturing process to reduce variability between plates. During or after bonding, one or more internally plumbed, perforated spray bars are used in maintain the fused plate at the optimal temperature, increasing the likelihood of a resulting fused plate that is flat and planar in nature, unbeaded from the hardening process, defining a reduced coefficient of friction relative to the original base metal plate, defining increased hardness and durability ratings, and capable of being reproduced plate by plate by plate.

DETAILED DESCRIPTION OF THE PREFERRED EMBODIMENT AND OPERATION OF THE INVENTION

Figure 9:
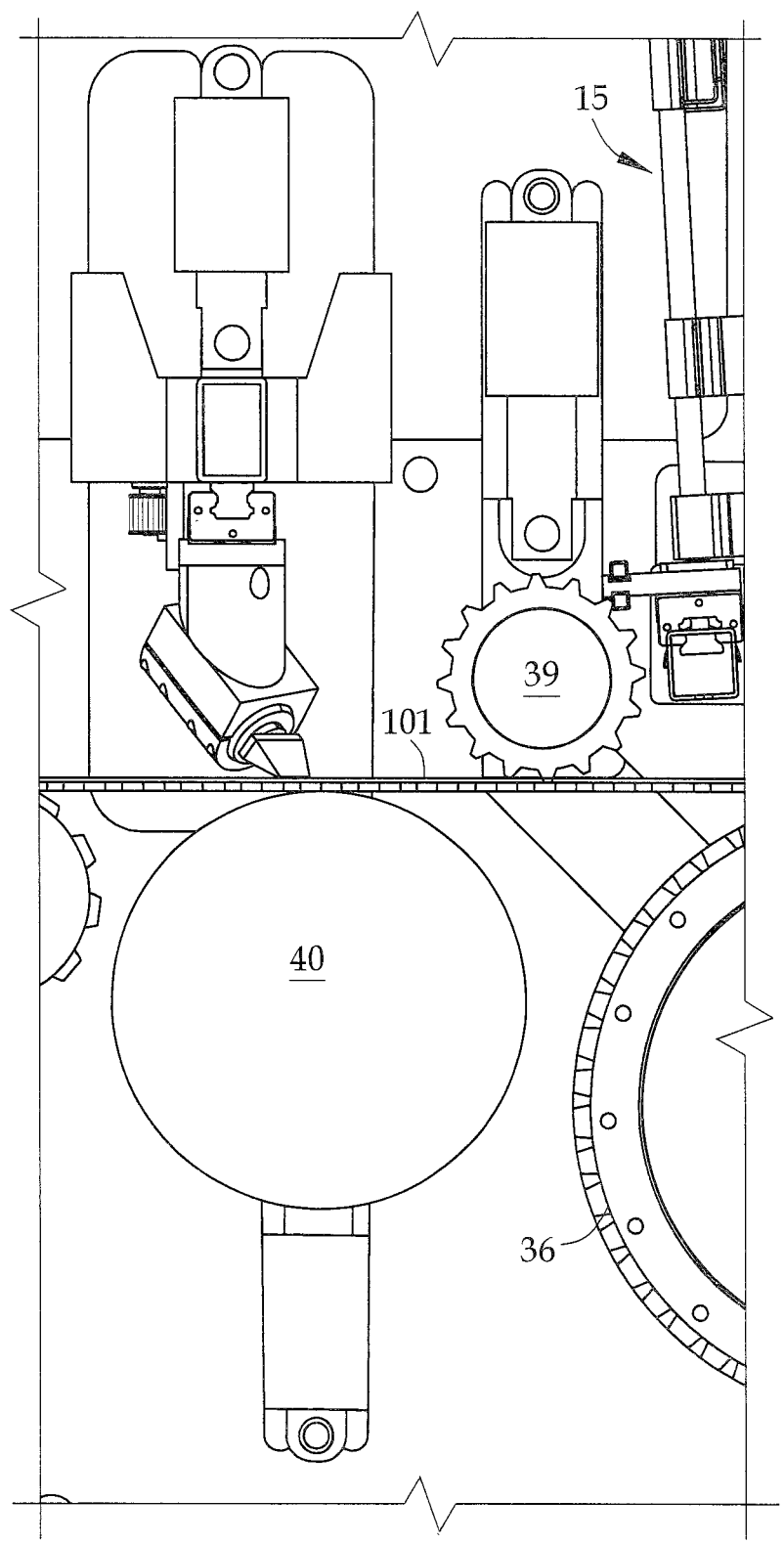
FIG. 9 depicts an elevated side view of support and cleaning roller component(s) of the apparatus of FIG. 1.
Figure 10:
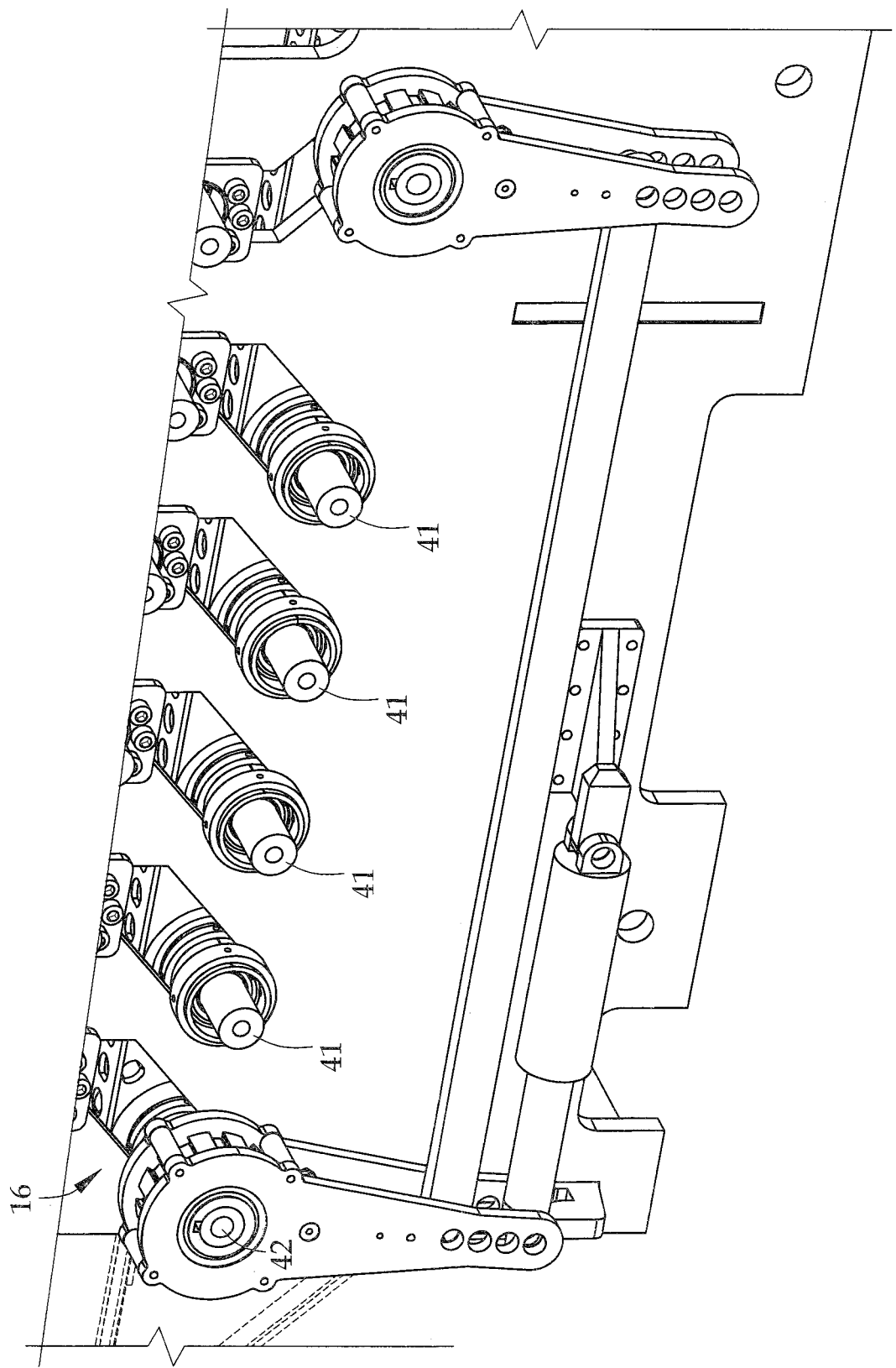
FIG. 10 demonstrates an elevated side view of the straightening roller component(s) of the apparatus of FIG. 1.
Figure 11:
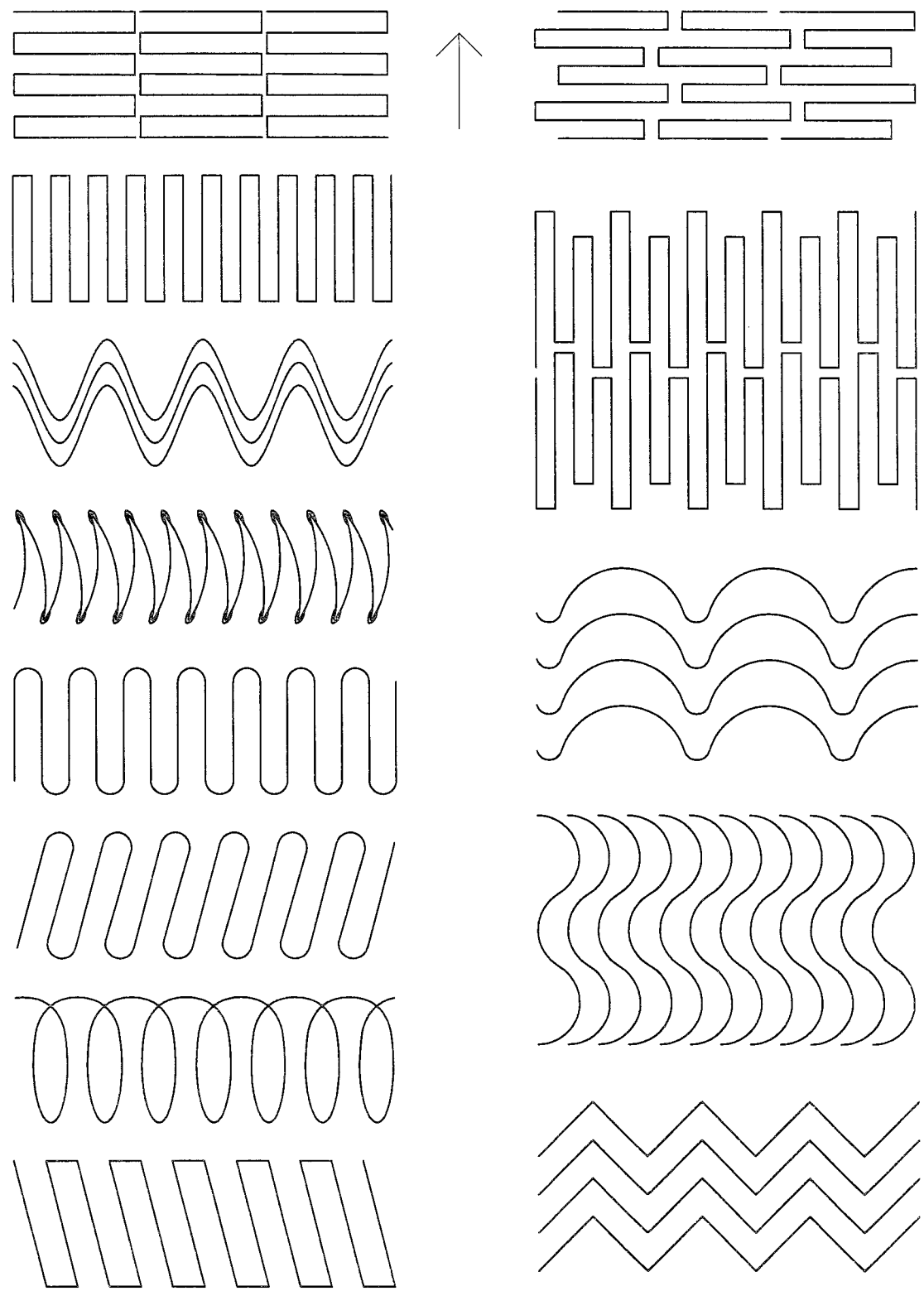
FIG. 11 displays a schematic overview of the welding patterns capable of being produced by the apparatus of FIG. 1.

For a better understanding of the invention and its operation, turning now to the drawings, FIGS. 1-10 illustrate the preferred plate apparatus 10 including conveyor assembly 11 (FIG. 1A) supporting ground members 12, hopper assemblies 13 and 14 (FIG. 1B), wire feeder assembly 15, and straightener assembly 16 (FIG. 1C) that combine in whole or in part to overlay metal plate 101 with weld metal in a variety of patterns as illustrated in FIG. 11.

Figure 1:
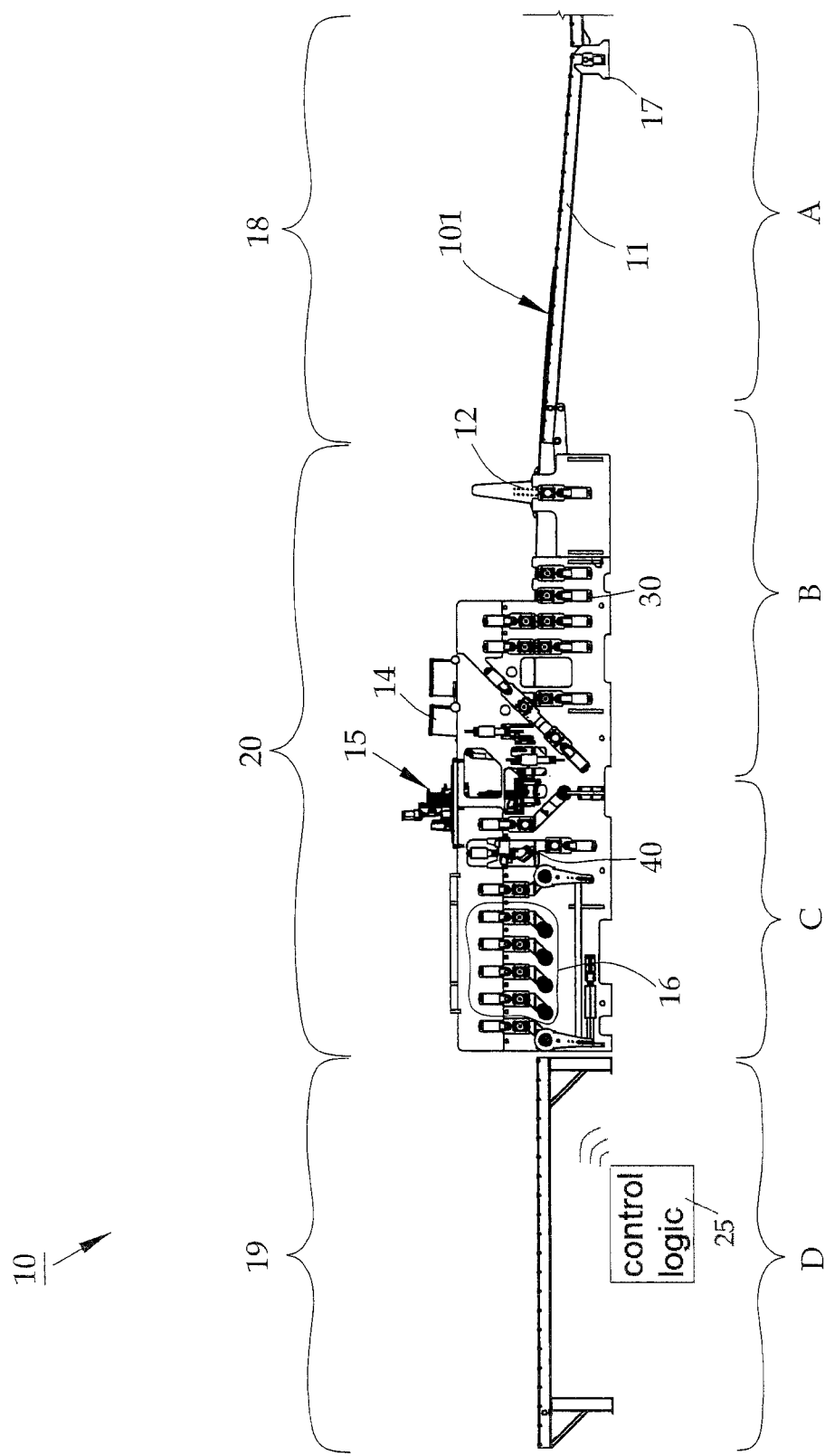
FIG. 1 shows an elevated side view of an improved apparatus for manufacturing fused overlay plate.
Figure 1A:
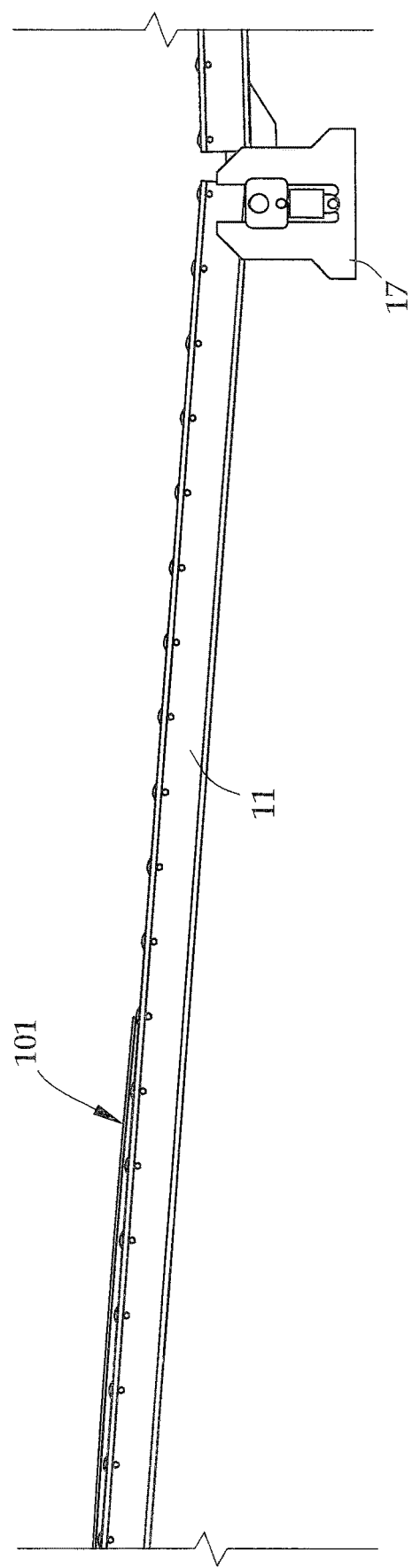
FIG. 1A demonstrates a partial view of the conveyor of the apparatus of FIG. 1 as seen by bracket A.
Figure 1B:
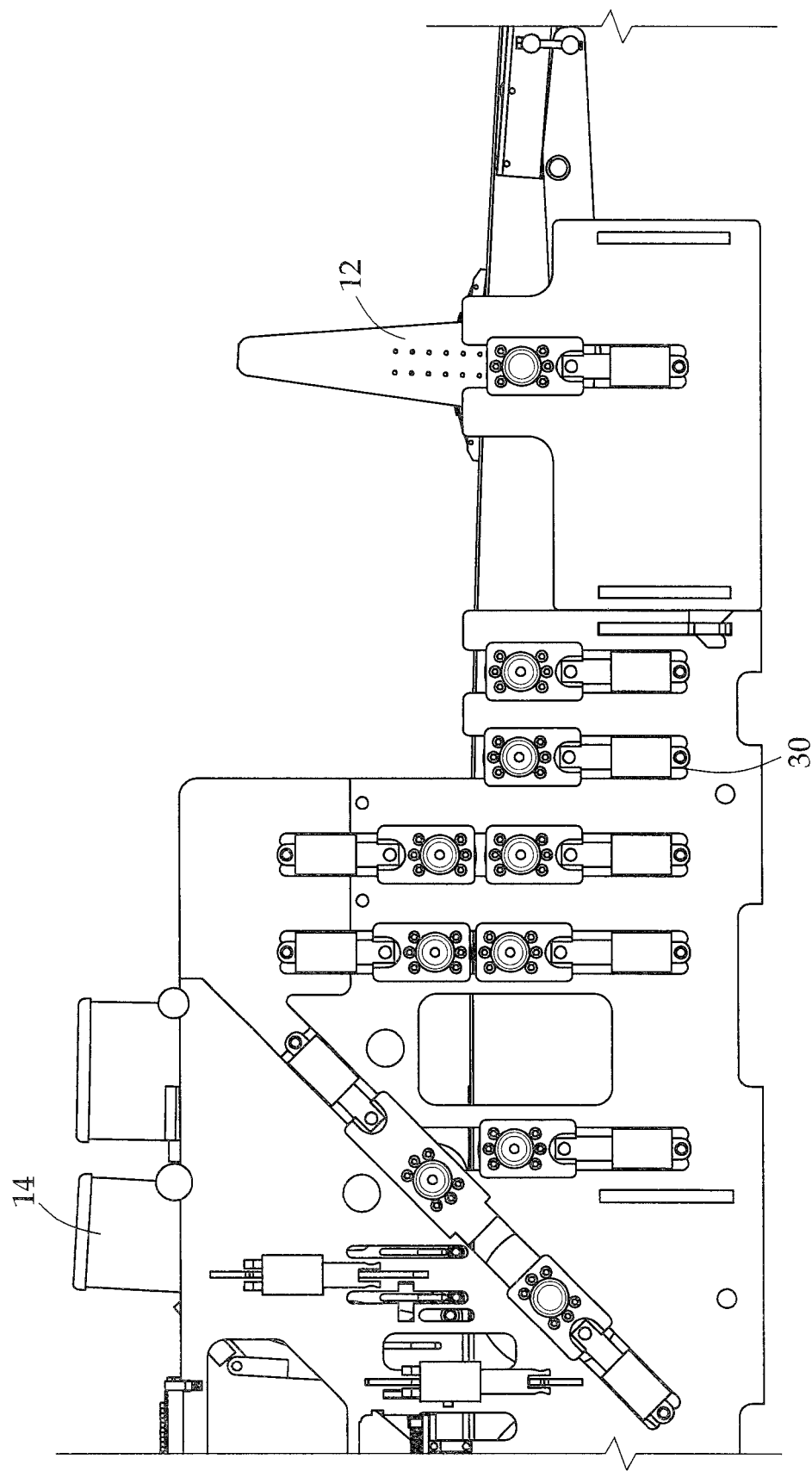
FIG. 1B pictures a partial view of the ground assembly of the apparatus of FIG. 1 as seen by bracket B.
Figure 1C:
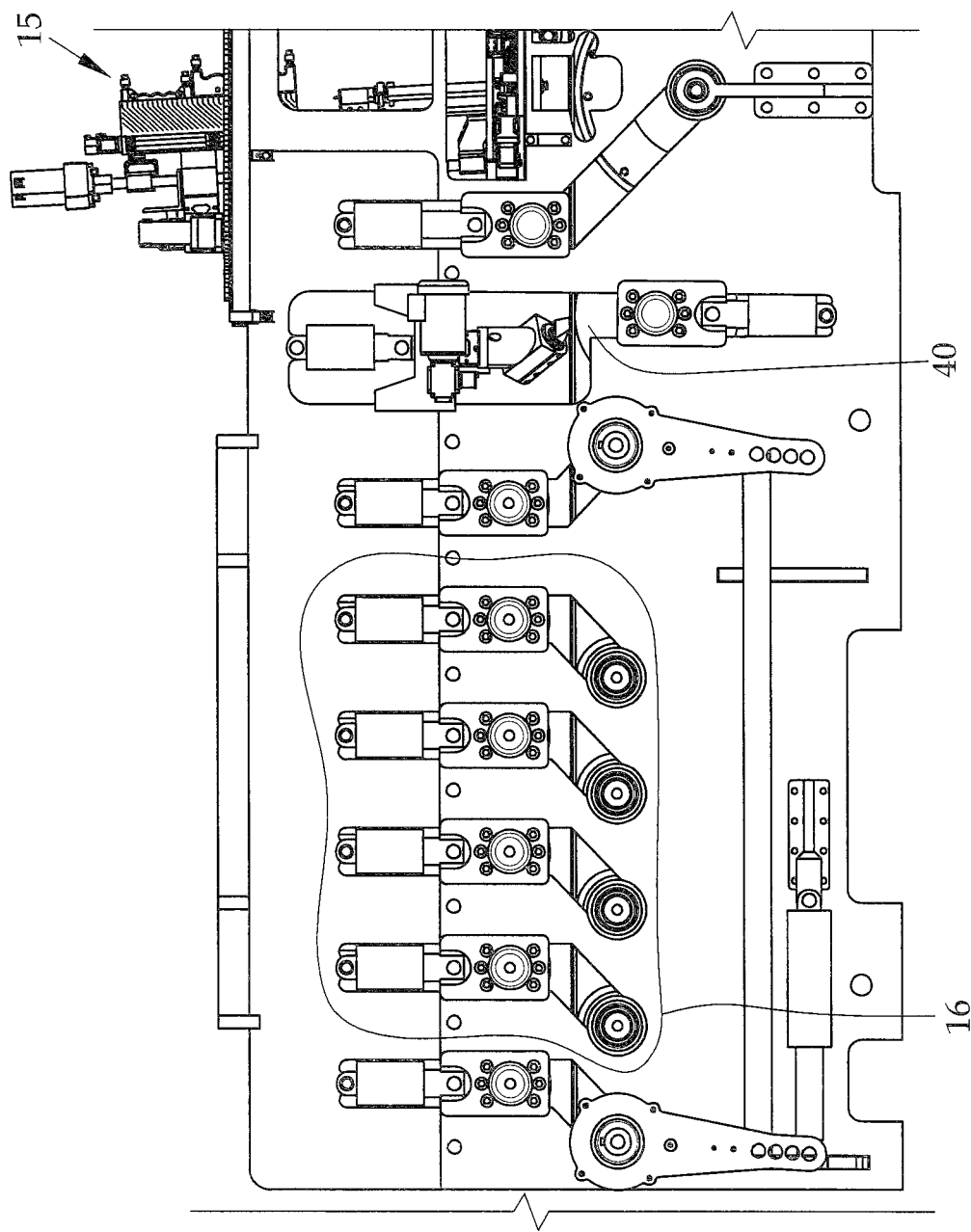
FIG. 1C depicts a partial view of the straightener assembly 16 of the apparatus of FIG. 1 as seen by bracket C.
Figure 1D:
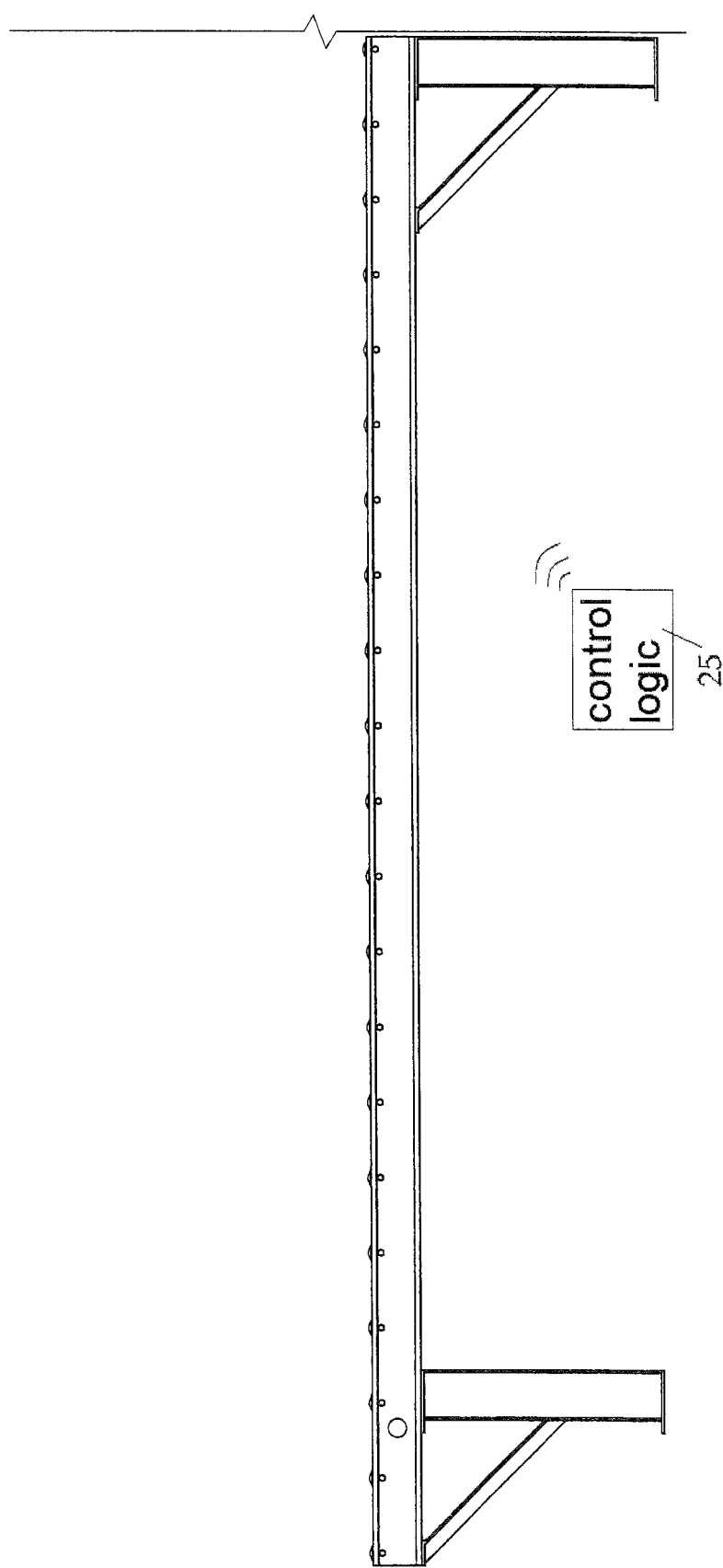
FIG. 1D illustrates a partial view of the conveyor portion of the apparatus of FIG. 1 as seen by bracket D.
Figure 2:
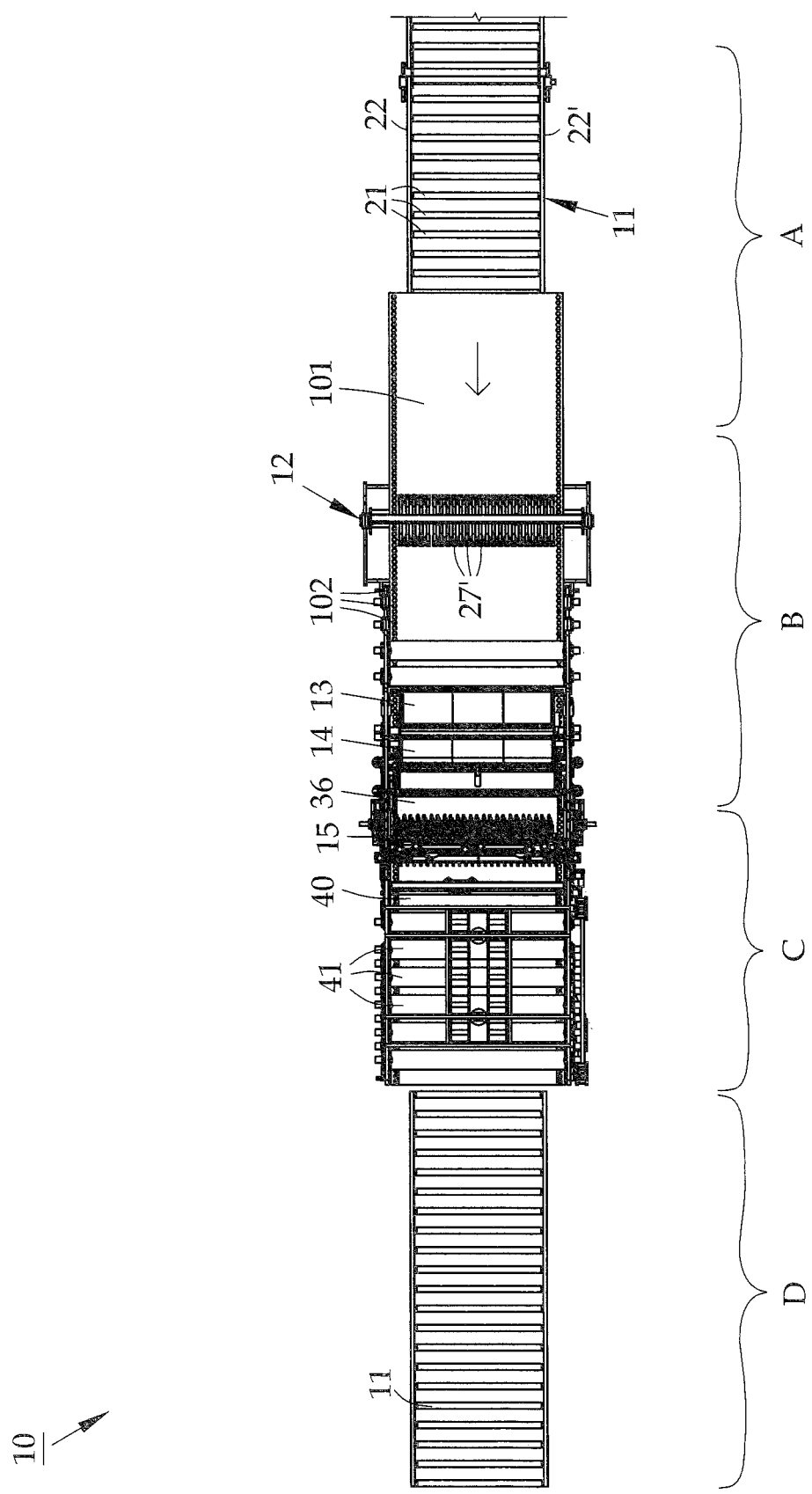
FIG. 2 pictures a top plan view of the apparatus of FIG. 1.
Figure 2A:
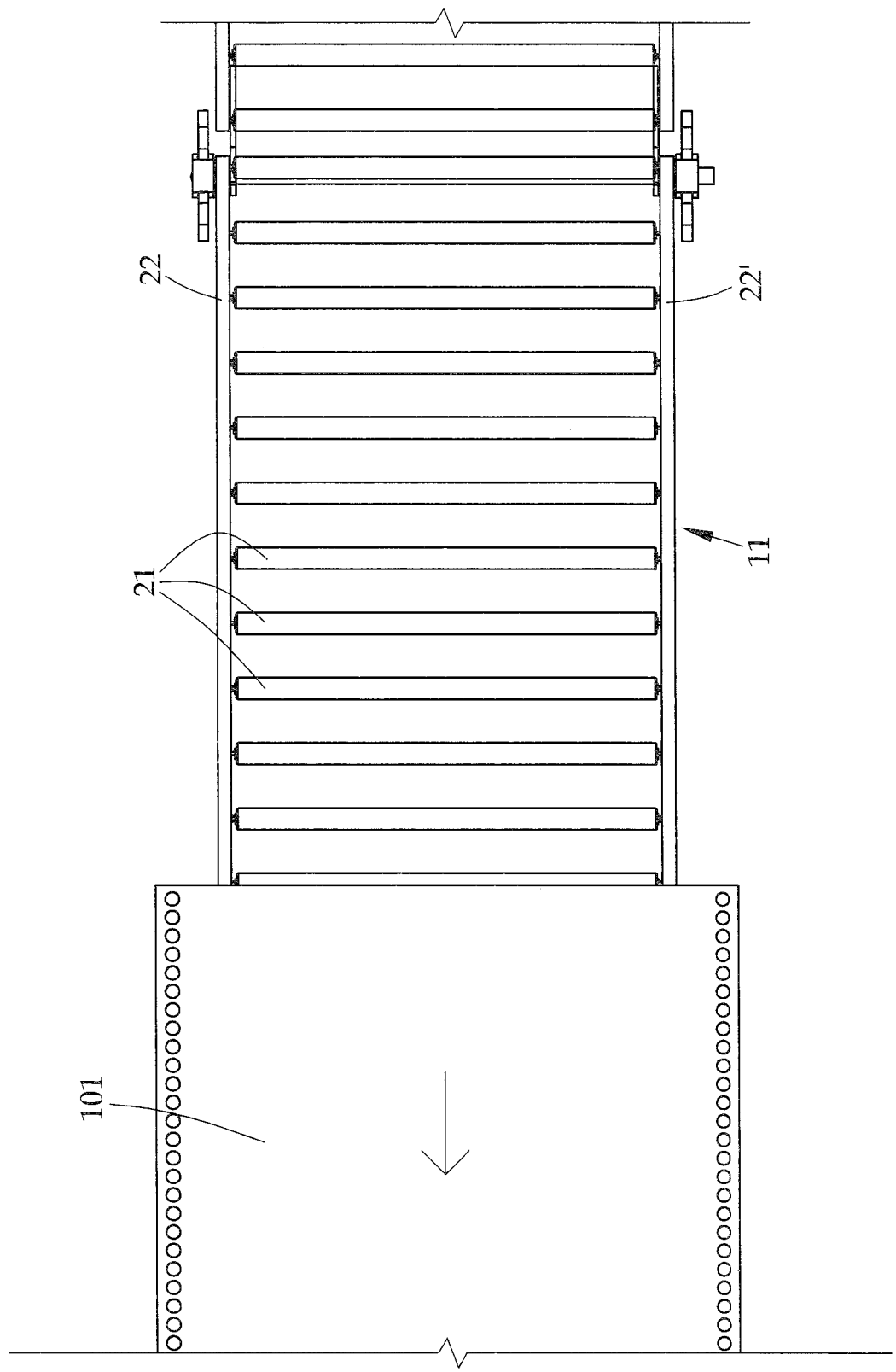
FIG. 2A demonstrates a partial view of the conveyor of the apparatus of FIG. 2 as seen by bracket A.
Figure 2B:
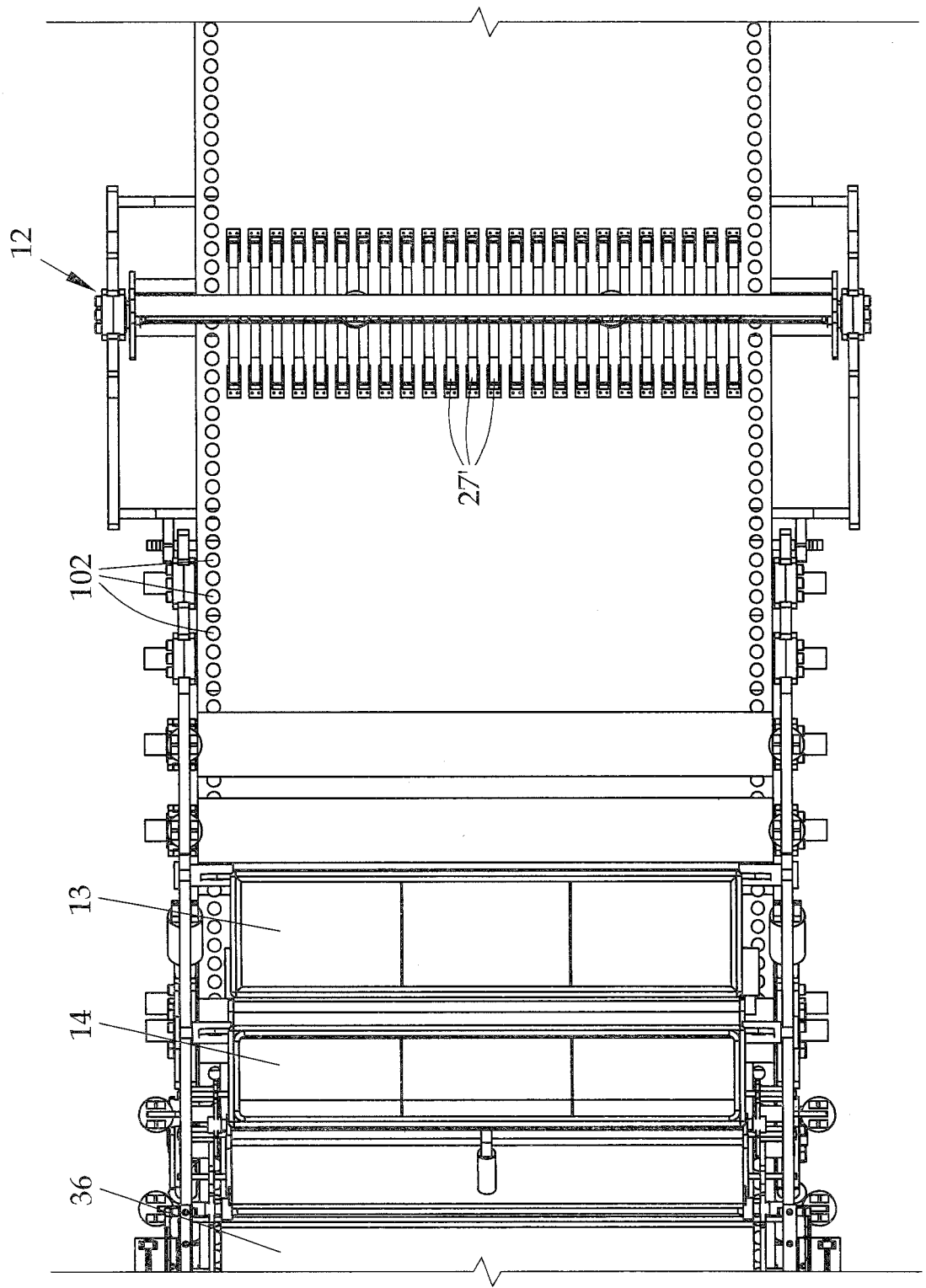
FIG. 2B pictures a partial view of the ground assembly of the apparatus of FIG. 2 as seen by bracket B.
Figure 2C:
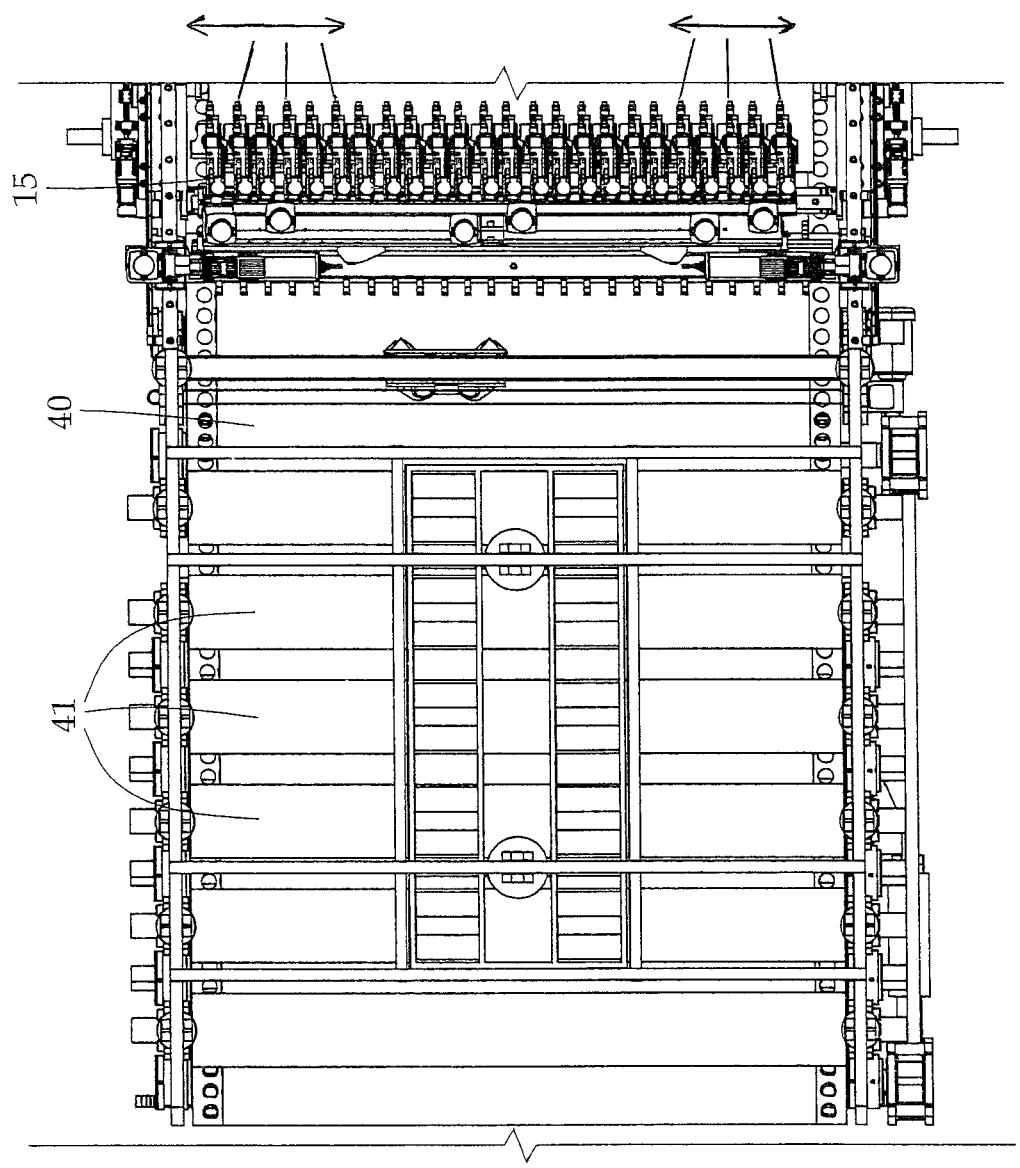
FIG. 2C depicts a partial view of the straightener assembly 16 of the apparatus of FIG. 2 as seen by bracket C.
Figure 2D:
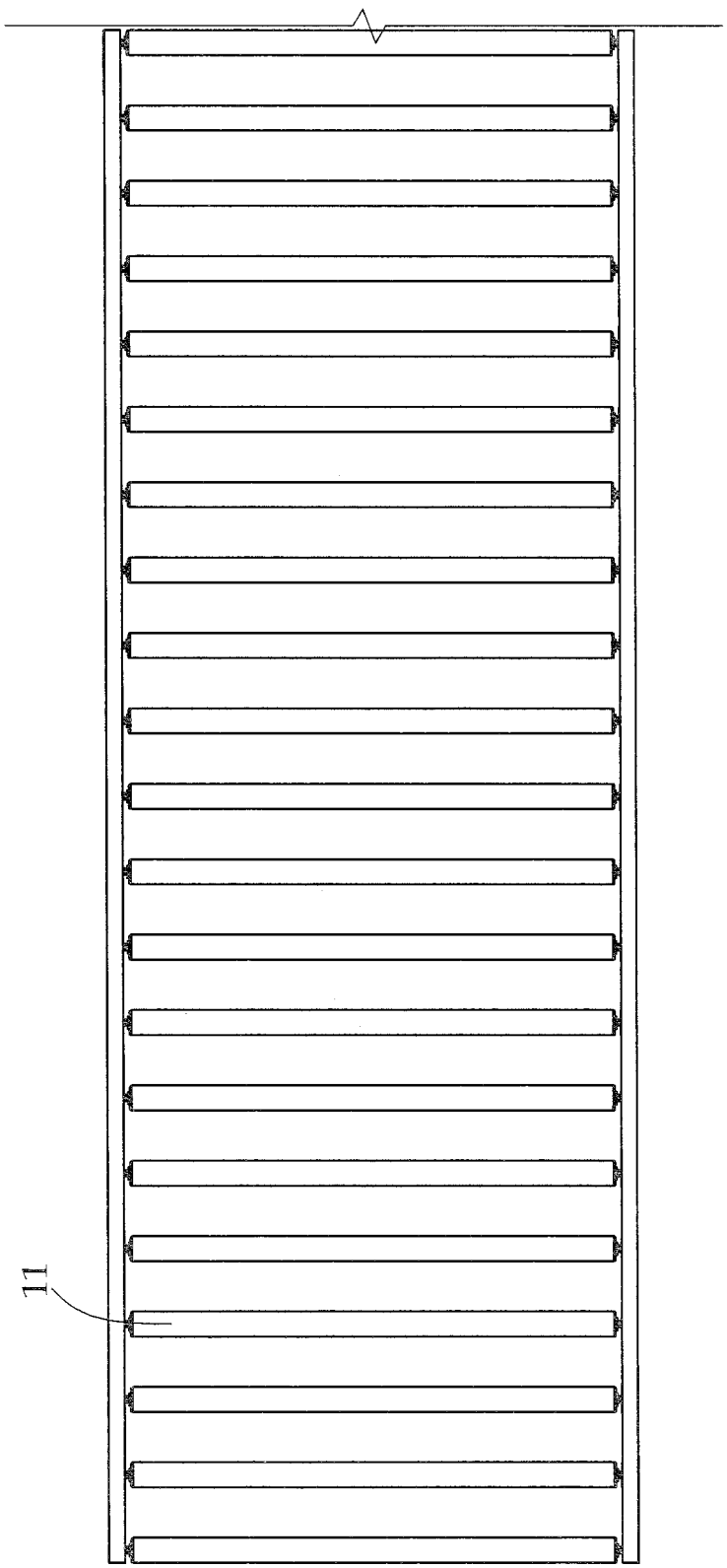
FIG. 2D illustrates a partial view of the conveyor portion of the apparatus of FIG. 2 as seen by bracket D.
Figure 3:
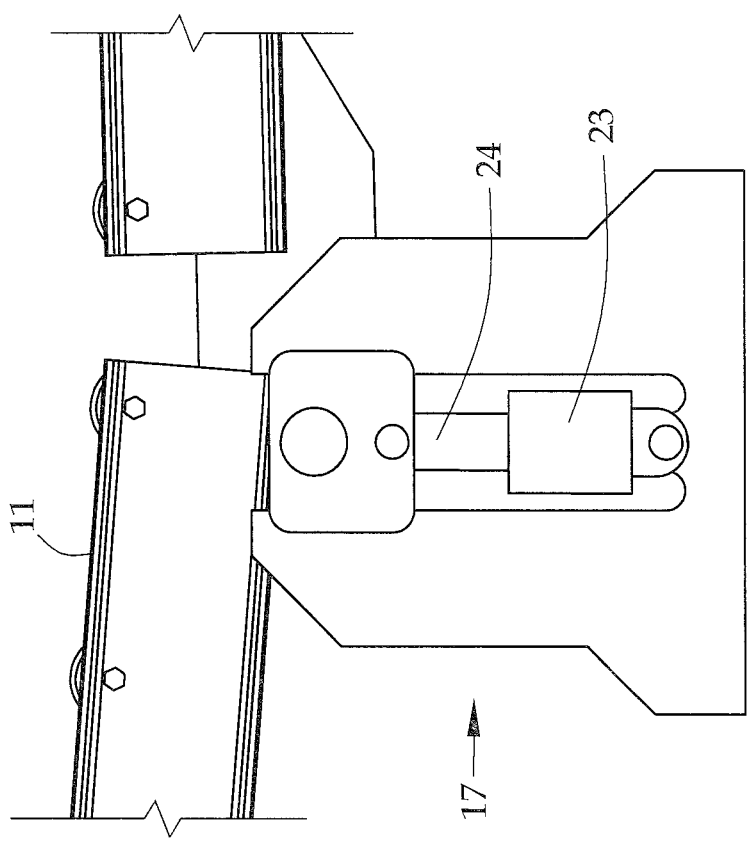
FIG. 3 depicts an elevated side view of an adjustable conveyor component of the apparatus of FIG. 1.

As shown in FIGS. 1-3, conveyor assembly 11 preferably defines a plurality of legs 17 each that may vertically displace upwardly or downwardly as may be desirable for a specific operation. One embodiment of conveyor 11 is further divided into a first or front portion 18 (FIGS. 1, 1A, and 2A) and a second or rear conveyor portion 19 (FIGS. 1, 1D, and 2D), with a third or central frame portion 20 (FIGS. 1, 1B, 1C, 2B, and 2C) positioned in-between the first and second conveyor portions, respectively. One or more cylindrical rollers 21 are preferably rotatably affixed between opposingly oriented frame members 22, 22' (FIG. 2A) and configured so as to support embodiments of base metal plate 101 entering or exiting preferred apparatus 10 as seen by directional arrows in FIG. 2. In one embodiment, frame members 22, 22' are spaced so as to accommodate up to an eight (8) foot by twenty (20) foot plate of A-36 steel thereon. As previously stated, legs 17 are vertically displaceable, so as to accommodate the preferred feed speed, angle, and thickness of base metal plate 101 into the central portion 20 of conveyor assembly 11. Although not intended as a limitation of the instant invention, one embodiment of leg 17 includes mounting bracket 23 attached to powered ram 24 that is sized, shaped, and otherwise configured to vertically adjust the height of the conveyor assembly with which it is associated, such as by pneumatics, hydraulics or otherwise as is known in the art, to properly orient camber of plate 101 during cladding. Although not illustrated, one or more sensors in communication with control logic 25 can determine the desired orientation and configuration of one or more parts of conveyor 11 and make electronic adjustments accordingly.

Figure 4:
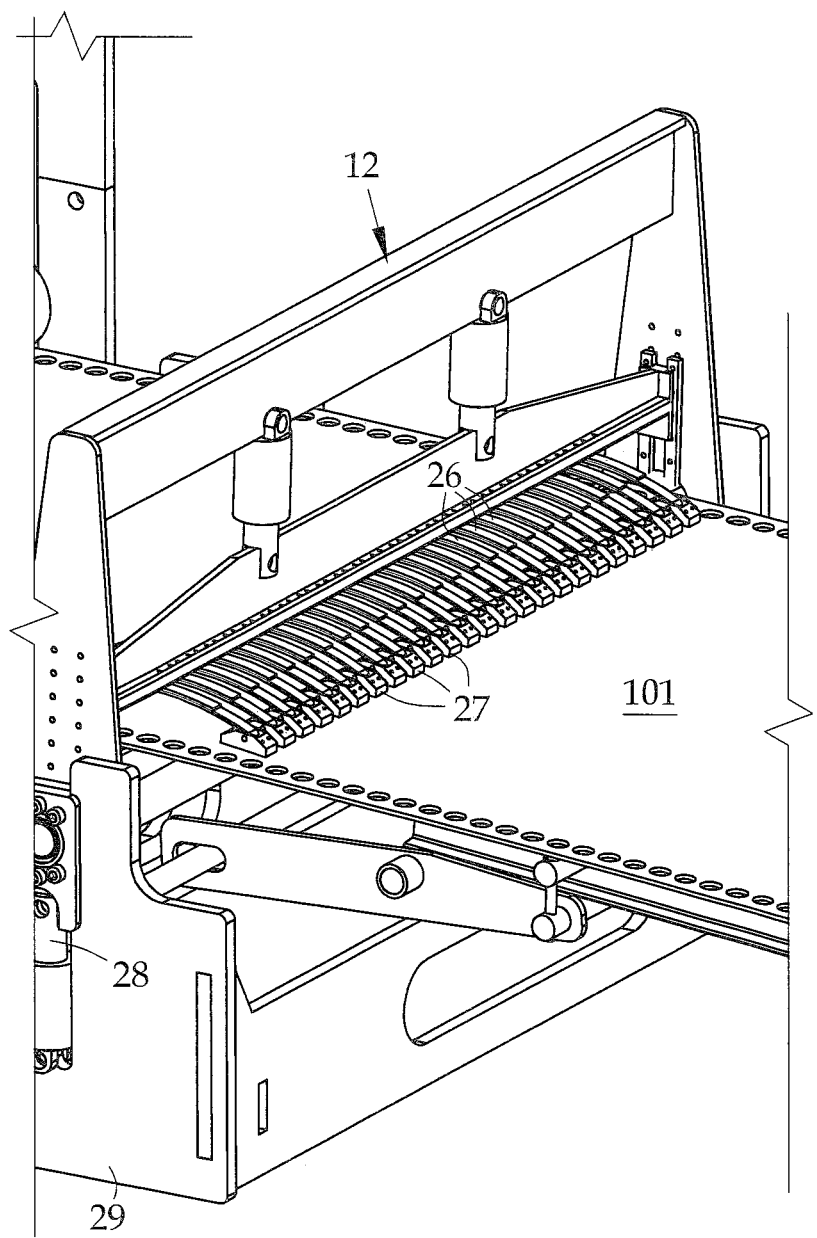
FIG. 4 demonstrates an elevated perspective view of a ground component of the apparatus of FIG. 1.
Figure 5A:
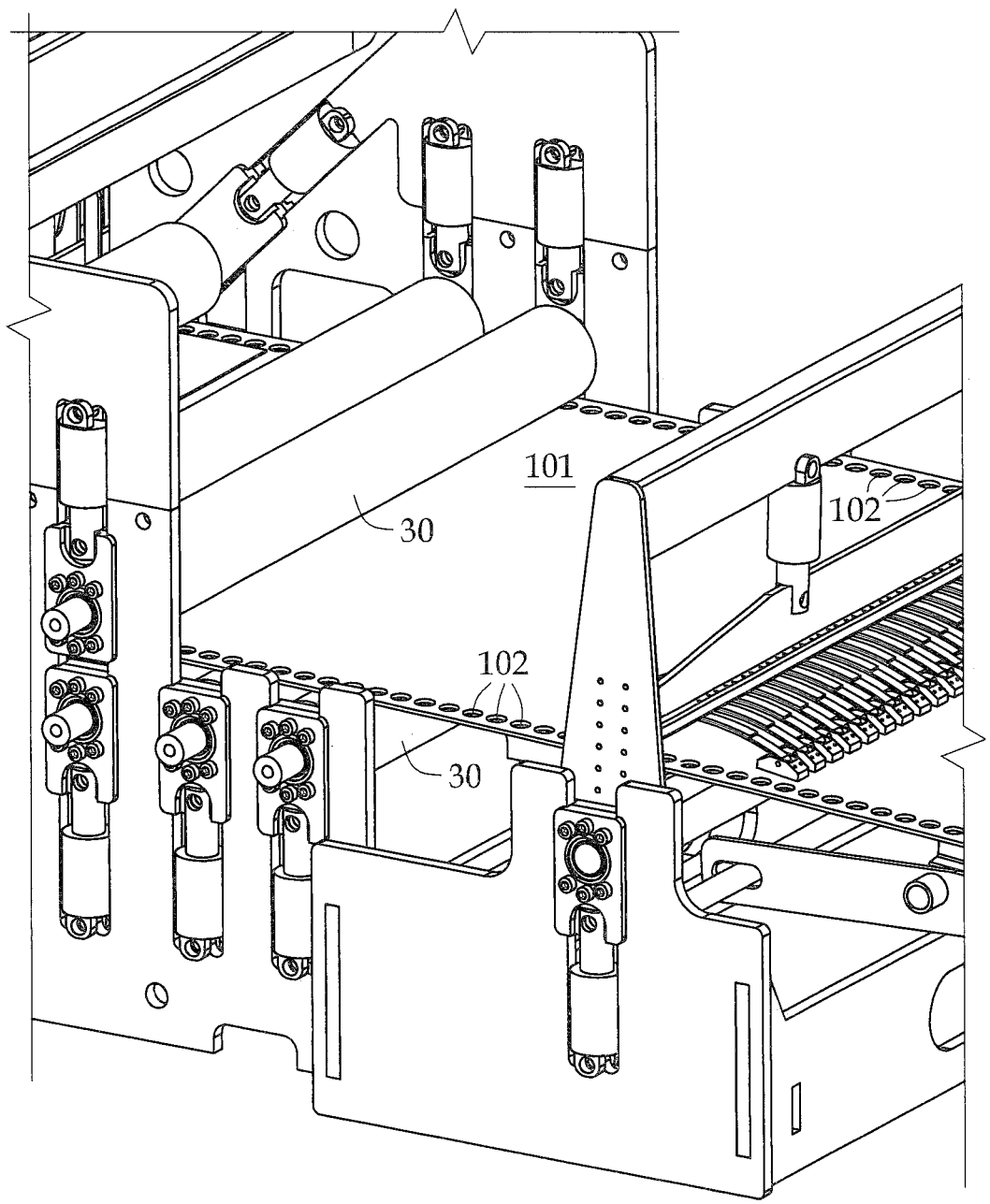
FIG. 5A illustrates an elevated perspective view of a drive component of the apparatus of FIG. 1.
Figure 5B:
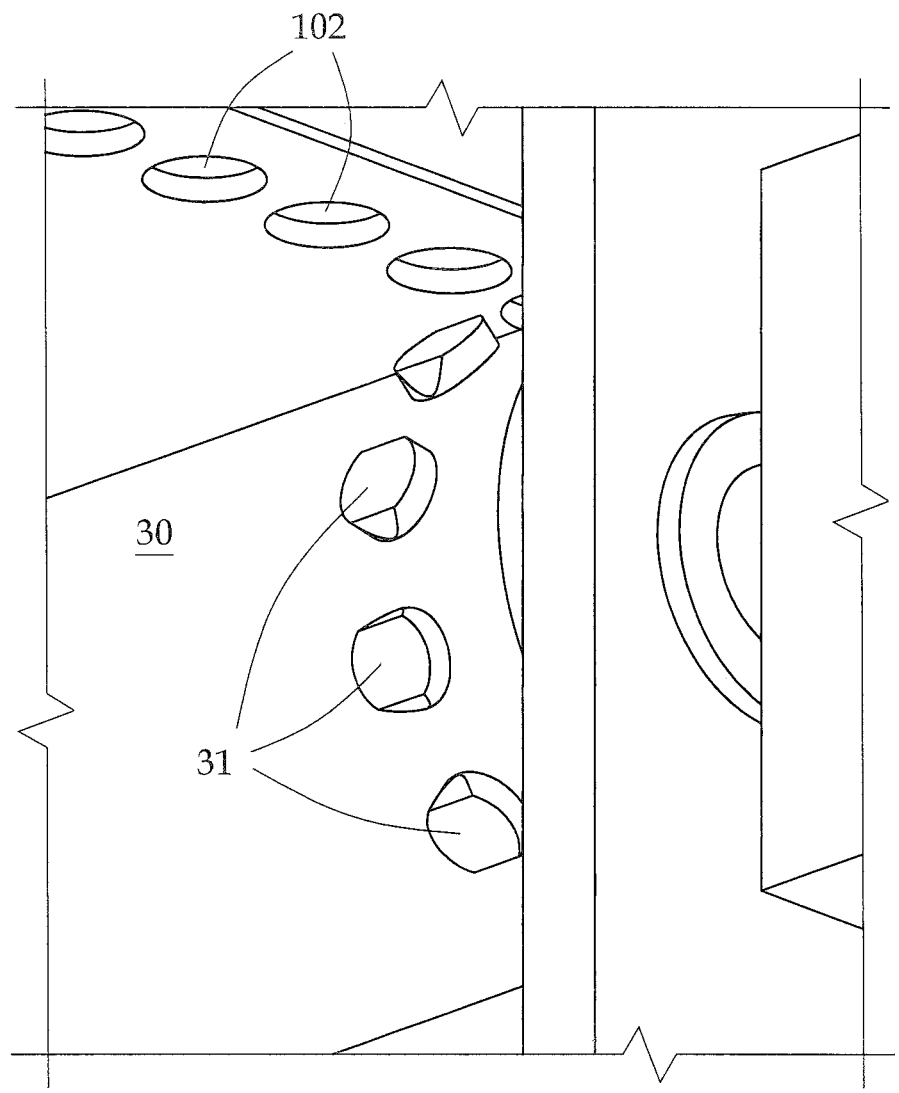
FIG. 5B pictures an enlargement of a portion of the drive component of FIG. 5A.

As pictured in FIGS. 1-2 and 4, ground assembly 12 in the preferred embodiment is located proximate first conveyor assembly portion 18 at what may be considered the front of plate apparatus 10. In an embodiment, ground assembly 12 is defined by a plurality of biased arms 26 in the nature of a leaf spring with ground shoes 27, 27' attached at opposing longitudinal ends of respective arms 26. In the preferred embodiment, ground assembly 12 is vertically adjustable by virtue of one or more rams 28 mounted within ground frame 29 to accommodate a variety of plate thicknesses. The material of the plate and the thickness thereof are two important variables in the cladding process as described in further detail below. As the thickness of base plate 101 is determined, rams 28 compress or release arms 26 with the goal of ensuring that ground shoes 27, 27', preferably formed from an electrical "earth" ground material such as copper, remain in frictional contact with the surface of base plate 101 during its progression through central frame portion 20 of apparatus 10.

FIGS. 1-2, 5A and 5B illustrate a portion of central conveyor frame portion 20 between ground assembly 12 and first hopper assembly 13. In addition to conveyor rollers 21, one or more drive rollers 30 are disposed herein. Preferably larger in diameter than conveyor rollers 21 (twelve (12) inches compared to three (3) inches), drive rollers 30 are vertically adjustable to accommodate and bias a range of thicknesses as defined by base plate 101. In the preferred embodiment, drive rollers 30 define a camber such that the middle portion of the roller is greater in terms of diameter than either roller end, resulting in a plate that maintains a consistent, desirable camber angle throughout the cladding process. In the enlarged illustration FIG. 5B, at least one drive roller 30 includes a plurality of annularly disposed cogs 31, either attached to a separate gear or integrally formed proximate the terminal ends of one (or more) drive rollers 30. Cogs 31 are ideally sized and shaped to engage within apertures 102 defined at the lateral margins of base plate 101, in one embodiment defining a two inch diameter. In one embodiment, one or more sensors (not shown) monitor the advancement of base plate 101, communicating with drive rollers 30 to advance base plate 101 at a predetermined rate, for example one inch or less per second, and more preferably 0.2 inches per indexing event, a measurement that is determined in part by the thickness of the plate being clad. As would be understood, the indexing event is measured as the time it takes for the wire feeder assemblies 15 to make one pass (as described in further detail below), for example a horizontal pass, a vertical pass, a circular pass, or even an interlocking pass. By electronically controlling the rate of advancement, and securely engaging base plate 101 via cogs 31 and apertures 102, base plate 101 can be maintained in a more planar configuration than known in the prior art, resulting in a superior cladded plate 101 as described in further detail below. This described mechanism of advancement is preferable to anything known in the prior art because it reduces compression otherwise needed to drive the cladded plate through the rollers and reduces or eliminates slippage in part resulting from the thermal expansion and/or contraction of the plate during the cladding process.

Figure 6:
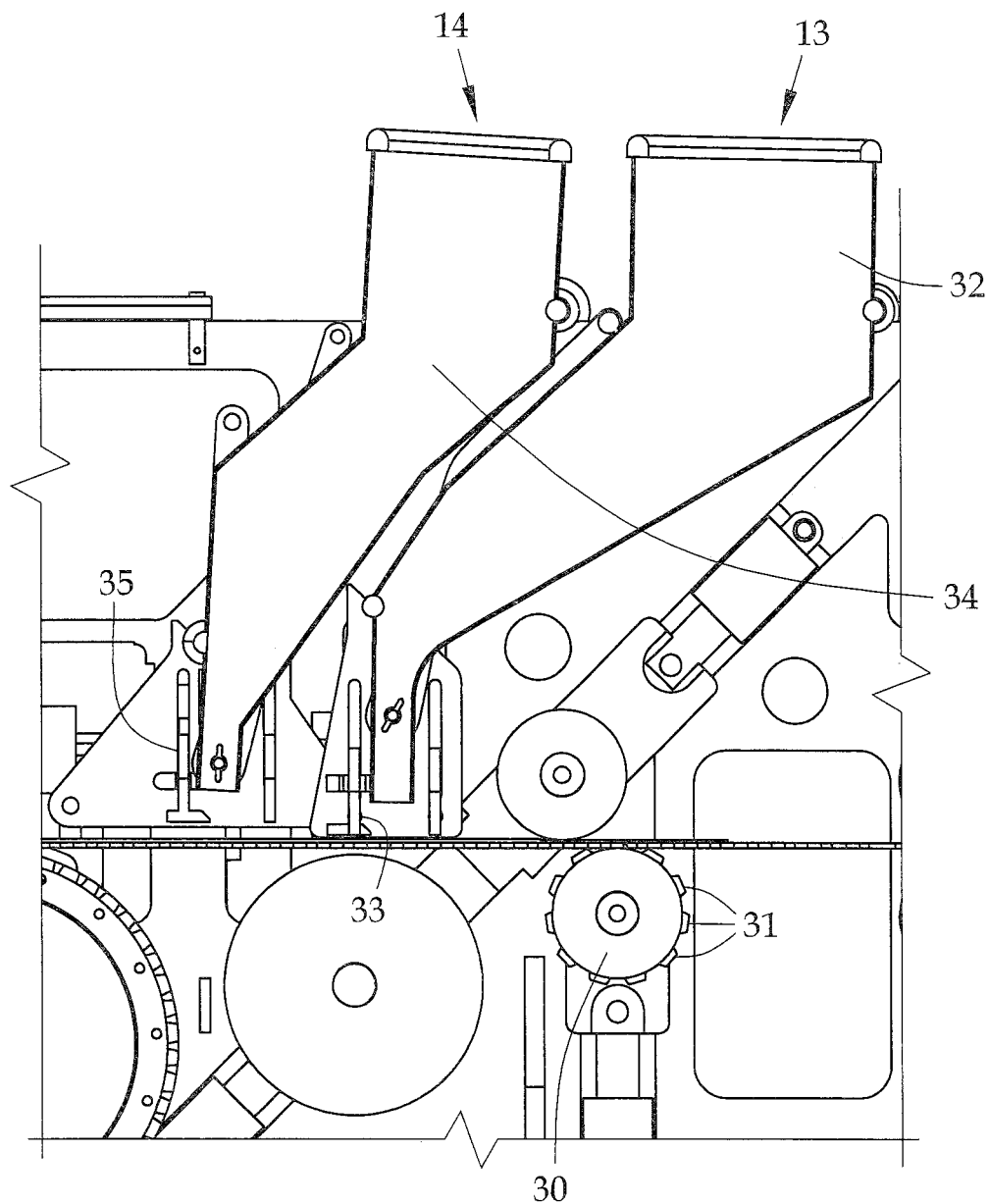
FIG. 6 features an elevated side view of the first and second hopper components of the apparatus of FIG. 1.
Figure 7:
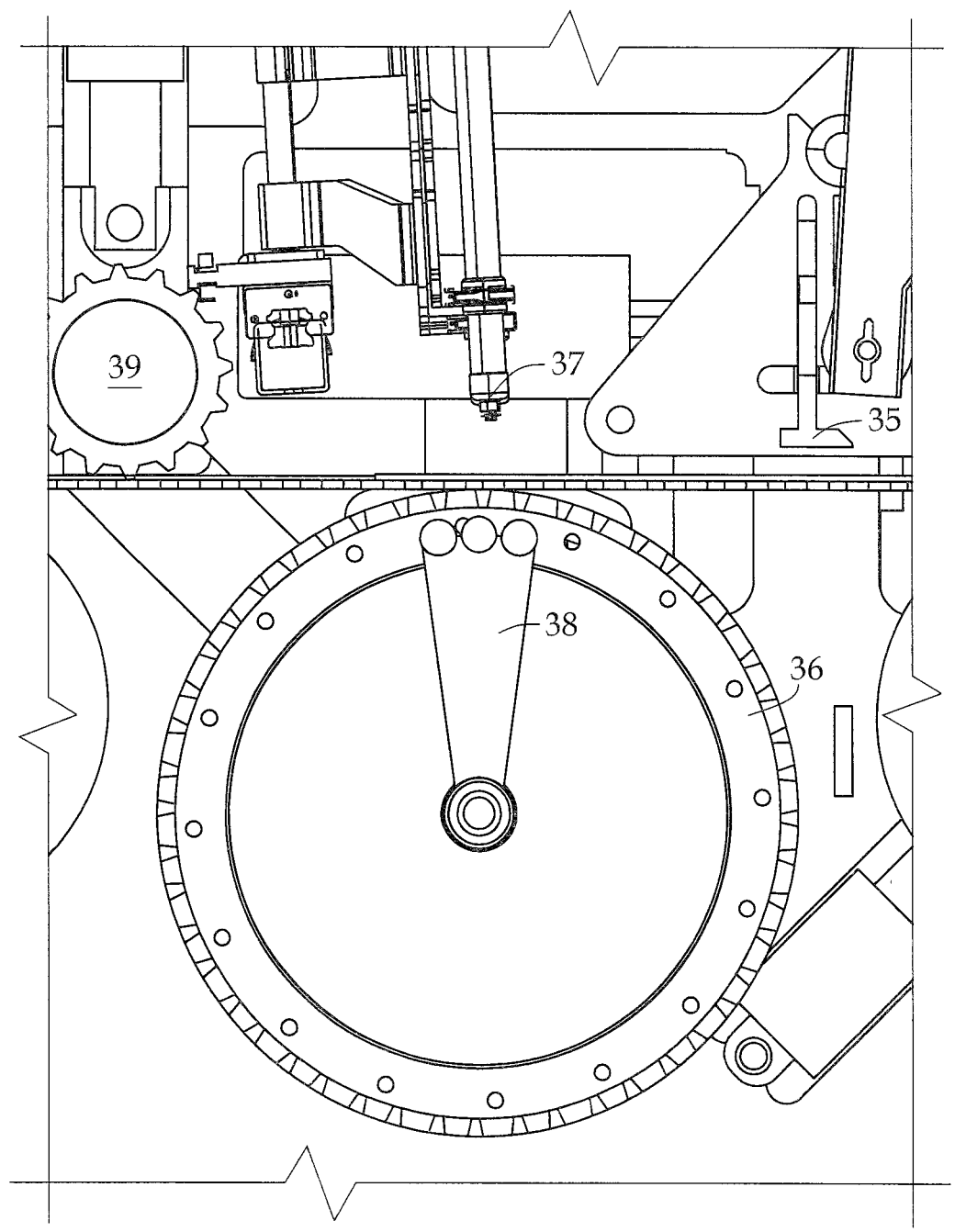
FIG. 7 shows an enlarged side view of a cooling drum component of the apparatus of FIG. 1.

FIGS. 1-2 and 6 demonstrate first and second hoppers 13 and 14 in further detail. As base plate 101 is advanced as described above, the upper surface passes beneath first hopper assembly 13, preferably in the nature of an open-ended box 32 disposed between one or more rakes 33. In an embodiment, rakes 33 are defined as screen members that are vertically adjustable to accommodate a wide range of thicknesses defined by base plate 101. Rakes 33 horizontally screen the top surface of base plate 101 as it receives the first layer of media (not shown) stored within first hopper 13, in the preferred embodiment a powderized metal composition such as chromium, iron, niobium, titanium, nickel, manganese, tungsten, boron, sulfur, carbon, phosphorus, copper, and combinations thereof. By horizontally raking the media surface as plate 101 moves in the horizontal direction, a consistent media thickness and planar shape to achieve the nominal manufactured total thickness of the finalized cladded plate. Similarly, second hopper assembly 14 is preferably defined as an open-topped box 34 disposed between rakes 35. Like rakes 33, rakes 35 are defined as screen members that are vertically adjustable to accommodate a wide range of thicknesses defined by base plate 101 and horizontally screen the top surface of base plate 101 as it receives the second layer of media (not shown), stored within second hopper 14, in the preferred embodiment a powderized insulation composition such as silica (i.e. sand) (but may also contain other materials such as lime, calcium fluoride, manganese oxide and other compounds) to reduce or eliminate the amount of oxygen present during the submerged arch welding process to follow. In an embodiment, first and second hopper assemblies 13 and 14 are movably mounted to an outer wall of plate apparatus 10, facilitating longitudinal and/or lateral displacement relative to base plate 101 as it moves horizontally through apparatus 10. In the preferred embodiment, this displacement takes the form of sliding backwards and forwards as well as moving up or down to account for plate and media thickness, maintaining the consistency of the media as described above. Preferably, a rotational valve extends across the vertical length of one or both hopper assemblies 13, 14 which may control the discharge rate of the affiliated media. Supporting base plate 101 as it travels beneath hopper assemblies 13 and 14 is preferably a cambered drive support roller that is vertically adjustable, either mechanically or via control logic 25. This support roller defines a camber to aid in the maintenance of the uniformity of the media thickness, specifically the first media thickness. In the preferred embodiment, this support roller evens the cambered load before the metal thermal fusion process and any contemporaneous and/or subsequent cooling as described in further detail below.

FIGS. 1-2 and 7-8 illustrate various aspects of wire feeder assembly 15 and cooling drum 36, preferably disposed in line vertically with one another within plate apparatus 10. In one embodiment, a plurality of wire feeders are disposed above cooling drum 36, and in the preferred embodiment the number of wire feeder assemblies 15 is numbered at twenty-four (24). Unlike the prior art that relies on a single control shaft to govern all wire feeders, preferred wire feeder assemblies 15 have individual motor clearances and are oriented vertically with a lateral distance between respective wire feeder assemblies 15 of four inches or less. In one embodiment, each wire feeder assembly 15 defines a power head 37 configured to receive and utilize direct current (DC) flow sufficient to render molten the metallized media carried by base plate 101, and in the preferred embodiment each power head 37 is configured to handle at least 1000 amps (1 k amps) per power head 37. Embodiments of plate apparatus 10, and specifically control logic 25, may operate all wire feeder assemblies 15 simultaneously, or predetermined groupings may be operated in sequence, for example a group of four (4) wire feeder assemblies 15 start before a second, third, fourth, fifth, and sixth grouping of four (4) wire feeder assemblies 15. Each assembly 15 is preferably independently driven by a dedicated motor with a wire speed encoder to maintain speed for the amps utilized and signal the wire spool drive motors as the wire is continuously consumed. In the preferred embodiment, each of the wire feeder assemblies 15 further comprises a gear-driven, individual filler, metal feed unit that is liquid- or gas-cooled that is configured to supply voltage and current through the insulating media and through the metallic powder to create a metallurgical fusion bond with the base metal plate 101, resulting in one embodiment forming chromium carbide that eventually grows out of the fused and cooled powder mixture. In one preferred embodiment, each wire feeder assembly 15 is individually controlled by control logic 25, and every other wire feeder assembly 15 in the group of twenty-four (24) is configured (i.e. sized, shaped, and oriented) such as demonstrated in FIG. 2C by directional arrows for a transverse "scissor" type motion as base plate 101 is advanced therebeneath. Coupled with the horizontal motion of base plate 101, this oscillating backwards, forwards, and lateral movement(s) in a multi-axis rotation creates desirous welding patterns in the surface of base plate 101 that have, heretofore, been unachievable in the prior art (see FIG. 11 for some non-limiting examples of the patterns achieved by the instant apparatus). As previously noted, an indexing measurement is responsible for the longitudinal advancement of plate 101, determined in large part on the lateral, transverse, or other motion of the wire feeder assemblies as described above. In one embodiment, it takes approximately ten seconds for each wire feeder assembly 15 to lay down its predetermined pattern of weld, based on variables including (but not limited to) plate thickness, wire type, and/or matric media depth. Embodiments of apparatus 10 may even produce overlapping or interlocking weld patterns, fused into base plate 101 and cooled to produce a planar, unbeaded, hardened metal plate 110.

In order to produce the desirable hardened plates described above, the reaction must include welding at extremely high temperatures, but the temperatures must be checked or the material is rendered too molten and fails to bond to the base plate 101 or may become too brittle and crack. Therefore, sophisticated temperature control and measurement, for example including the use of one or more carbon sensors (not shown), is preferred to ensure that a substantial fusion bonding event takes place. In one embodiment, the temperature of base plate 101 during the fusion process is controlled from beneath base plate by virtue of cooling drum 36. In the preferred embodiment, cooling drum 36 is a 36-inch diameter, perforated cylindrical member with one or more spray bar(s) 38 plumbed therein. One embodiment includes a plurality of diamond shaped apertures formed in the surface of cooling drum 36 to permit water to exit substantially the entire length of the drum, and the one or more spray bar(s) 38 may be angled or biased to distribute water in view of the same. One or more embodiments may hold cooling drum 36 in a water bath when not in use, facilitating a water-cooled surface when the cladding process is taking place. As the fusion process takes places, one or more temperature sensors (not shown) monitor variables including, but not limited to, the temperature of the base plate and the temperature of the fusion material. In the event the temperature grows too hot, control logic 25 engages the one or more spray bars 38, to spray air or water into the perforated cylinder for transference to the bottom surface of base plate 101, cooling it throughout and facilitating a robust metallurgical fusion bonding, instead of attempting to direct the water to the bottom plate surface through ribs, discs, or the like as taught in the prior art (see for example, the Kostecki patent cited above). This prevents a creasing or buckling of the plate at high temperatures that is solved with plate apparatus 10. In certain embodiments, the one or more spray bars 38 are in a fixed position relative to cooling drum 36; in other embodiments, the one or more spray bars 38 rotate or oscillate with rotating drum 36. Also within the purview of control logic 25 is the rotational speed of drum 36 and the pressure of the expelled fluid, and in one embodiment the one or more spray bars 38 are configured with variable pressure outlets. A plurality of sensors and infrared beam(s) (not shown) monitor the rate of plate 101 as well as the depth and smoothness of media applied to the surface of plate 101, reporting this data back to control logic 25.

Figure 8:
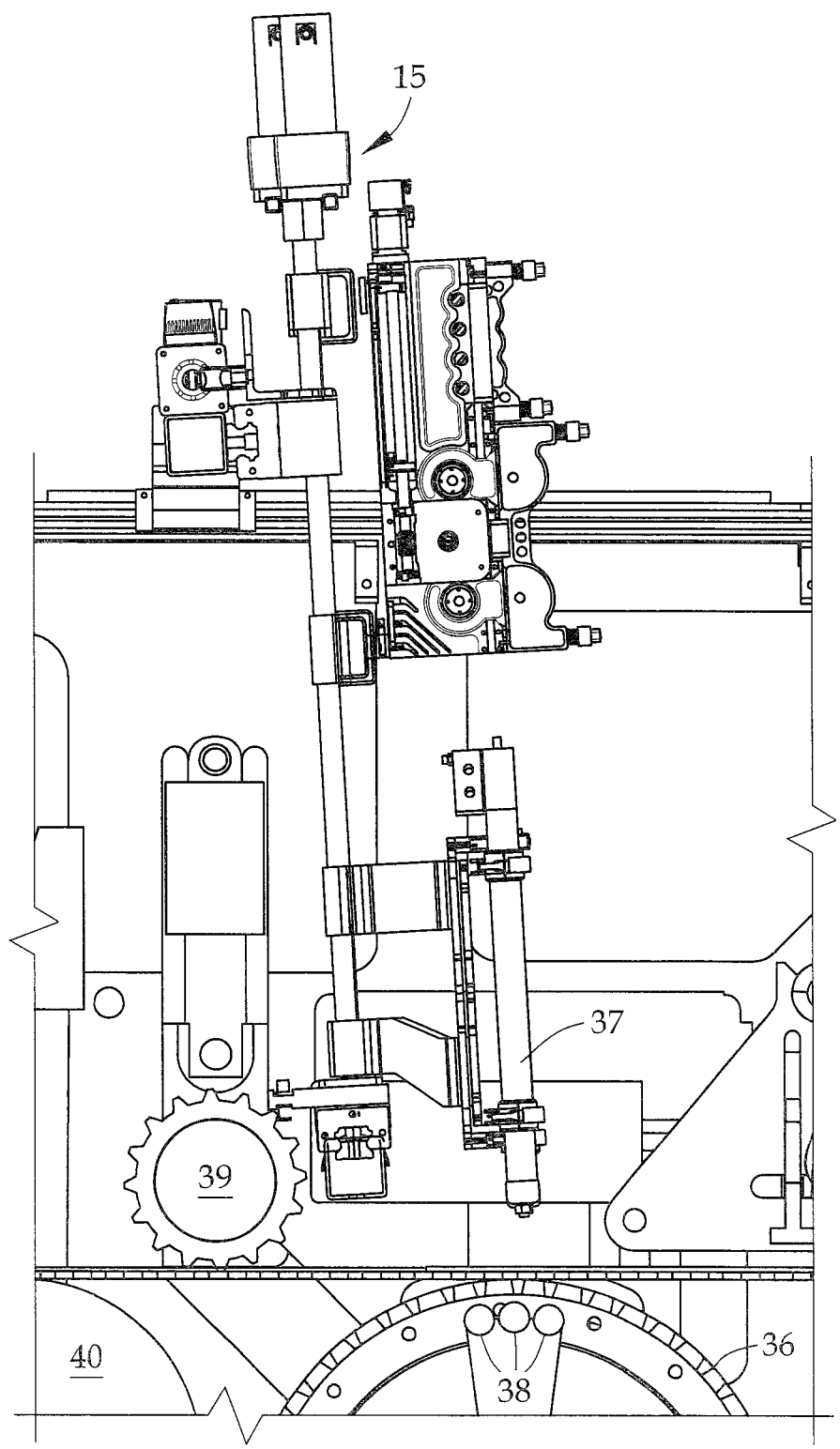
FIG. 8 illustrates an elevated side view of a thermal power head component of the apparatus of FIG. 1.

Embodiments of cleaner roller(s) 39, thermal roller(s) 40, straightener roller(s) 41, and exit roller(s) 42 that make up third conveyor portion 20 are demonstrated in FIGS. 8, 9, 10. In one embodiment, some or all off rollers 40, 41, and 42 are twelve inches in diameter. As plate 101, newly minted with a hardened treatment such as chromium carbide, moves beyond power heads 37, an excess of material may build up on the plate that is undesirable or otherwise detrimental either to the plate or plate apparatus 10. In one embodiment, one or more cleaner rollers 39 are defined as a slag cracking wheel which comprises a plurality of annular discs fitted onto a central boss and which are run onto the weld surface of the metal arc of welding which causes any slag on the surface to crack. The cracked slag is drawn by means of a vacuum suction arrangement before the slag cracking wheel, after the slag cracking wheel, or both. Embodiments of thermal roller(s) 40 may be interspersed with cleaner roller(s) 39 or may be positioned thereafter. Thermal rollers 40 preferably include temperature modifying components therein, for example to temper the temperature differential between the welding heads 37 and the ambient air to prevent cracking, or to slowly cool the newly welded plates. In one iteration, thermal rollers 40 are comprised of liquid or gas-cooled rollers sized, shaped, and otherwise configured to pass the hardened plate therebetween. Straightener roller(s) 41 may take a variety of forms, but one preferred embodiment includes a plurality of roller cylinders positioned above and below conveyor 11, with at least the upper roller embodiments biased in the downward direction (for example by tensioner members, hydraulic pressure, or the like), applying pressure to the plate to confirm that it is maintained in the straightest possible configuration. One or more sensors (not shown), for example infrared beam detection, may be used to confirm the planar nature of the plate, and if minute, undesirable curvature is detected, these sensors may report back to control logic 25 and variations in the pressure exerted by rollers 41 may be effectuated. For example, the plus/minus calibration of the pressure or pressures exerted by straightener rollers 41 may be modified by control logic 25, resulting in a hardened finished plate 110 that is maintained in the preferred orientation during cooling, further resulting in a more consistent plate production than known in the prior art. As finished plate 110 moves out of cleaner roller(s) 39, thermal roller(s) 40, and straightener roller(s) 41, it may be desirable to separate, divide, or otherwise cut the hardened plates into smaller sizes. Therefore, embodiments of plate apparatus 10 may including a cutting member, in the preferred embodiment of plasma cutting torch (not shown) capable of cutting the hardened plate into any size, shape, or repeated width and/or length as determined by control logic 25. Additional features may include etching the plate with identifying information such as time, date, location, manufacturer, lot/batch numbers or the like, allowing for unparalleled consistency in the production of highly capable hardened metal members.

A method of manufacturing a hardened metal plate is also disclosed, including the step of providing preferred plate apparatus 10 as described above. One or more cylindrical rollers 21 are preferably rotatably affixed between opposingly oriented frame members 22, 22' and configured so as to support embodiments of base metal plate 101 entering or exiting preferred apparatus 10, in the preferred embodiment an 8×20 ft. plate of A36 steel. One embodiment of legs 17 includes mounting bracket 23 attached to powered ram 24 that is sized, shaped, and otherwise configured to vertically adjust the height of the conveyor assembly 11 with which it is associated via control logic 25. A ground assembly 12 is defined by a plurality of biased arms 26 in the nature of a leaf spring with a ground shoe 27, 27' attached at opposing longitudinal ends of respective arms 26 to contact base plate 101 to prevent electrical shock risk. One or more apertures 102 are formed within plate 101 to accommodate a plurality of annularly disposed cogs 31, either attached to a separate gear or integrally formed proximate the terminal ends of one (or more) drive rollers 30 in order to advance plate 101 without slippage, preferably advancing plate 101 at a rate of 0.2 inches per second through central frame portion 20. Plate 101 advances underneath the first of two hoppers, with a horizontally screen across the top surface of base plate 101 as it receives the first layer of media stored within first hopper 13, in the preferred embodiment a powderized metal composition such as chromium or iron. Plate 101 then advances under the second of two hoppers, with rakes 35 defined as screen members that are vertically adjustable to accommodate a wide range of thicknesses defined by base plate 101 and horizontally screen the top surface of base plate 101 as it receives the second layer of media, stored within second hopper 14, in the preferred embodiment a powderized insulation composition such as silica. Base plate 101 moves along to a plurality of preferred wire feeder assemblies 15 which are oriented vertically with a lateral distance between respective wire feeder assemblies 15 of four inches or less. In one embodiment, each wire feeder assembly 15 defines a power head 37 configured to receive and utilize direct current (DC) flow sufficient to render molten the metallized media carried by base plate 101, and in the preferred embodiment each power head 37 is configured to handle at least 1000 amps (1 k amps) per power head 37. Heads 37 weld a predetermined pattern into the surface of plate 101, including but not limited to the patterns displayed in FIG. 11. The temperature of base plate 101 during the fusion process is controlled from beneath base plate 101 by virtue of cooling drum 36. In the preferred embodiment, cooling drum 36 is a perforated cylindrical member with one or more spray bar(s) 38 plumbed therein. As the fusion process takes places, one or more temperature sensors (not shown) monitor variables including, but not limited to, the temperature of the base plate and the temperature of the fusion material. In the event the temperature grows too hot, control logic 25 engages the one or more spray bars 38, to spray air or water into cooling drum 36 for transference to the bottom surface of base plate 101, cooling it throughout and facilitating a robust metallurgical fusion bonding.

As plate 101 moves beyond power heads 37, an excess of material may build up on the plate that is undesirable or otherwise detrimental either to the plate or plate apparatus 10 and can be removed by a slag cracking wheel which comprises a plurality of annular discs fitted onto a central boss and which are run onto the weld surface of the metal arc of welding which causes any slag on the surface to crack. Thermal rollers 40 receive the hardened plate and include temperature modifying components therein, for example to temper the temperature differential between the welding heads 37 and the ambient air to prevent cracking, or to slowly cool the newly welded plates, all while being monitored by additional sensors in communication with control logic 25. Straightener roller(s) 41 may take a variety of forms, but one preferred embodiment includes a plurality of plates positioned above and below conveyor 11, with at least the upper roller embodiments biased in the downward direction (for example by tensioner members, hydraulic pressure, or the like), applying pressure to the plate to confirm that it is maintained in the straightest possible configuration, again monitored by one or more sensors communicating with control logic 25. As desired, a cutting member, in the preferred embodiment of plasma cutting torch (not shown) may cut the hardened plate into any size, shape, or repeated width and/or length as determined by control logic 25. Additional steps may include etching the plate with identifying information such as time, date, location, manufacturer, lot/batch numbers or the like, allowing for unparalleled consistency in the production of highly capable hardened metal members.

The illustrations and examples provided herein are for explanatory purposes and are not intended to limit the scope of the appended claims.

I claim:

1. An apparatus configured to produce fused overlay plates comprising
    a conveyor assembly configured to receive and transport a metal plate through the apparatus,
    at least one hopper assembly configured to distribute a first layer of a media stored within the at least one hopper assembly onto a surface of the metal plate,
    a plurality of wire feeder assemblies, each wire feeder assembly including a power head, and
    electronic control logic in communication with the conveyor assembly, the at least one hopper assembly, and the plurality of wire feeder assemblies, and a ground assembly in communication with the metal plate, the ground assembly defined by a plurality of biased arms, each biased arm in the nature of a leaf spring with a ground shoe attached at opposing longitudinal ends of each biased arm, at least one of the ground shoes in contact with the metal plate whereby the plurality of wire feeder assemblies render molten the media carried by the metal plate, producing a hardened treatment thereon.

2. The apparatus of claim 1 wherein the conveyor assembly further comprises one or more cylindrical rollers rotatably affixed between opposingly oriented frame members and configured so as to accommodate an eight foot by twenty foot metal plate thereon.

3. The apparatus of claim 1 wherein the conveyor assembly further comprises a plurality of legs, each leg including a mounting bracket attached to a powered ram, each leg configured to vertically adjust a height of the conveyor assembly.

4. The apparatus of claim 1 wherein the conveyor assembly comprises at least one drive roller including a plurality of annularly disposed cogs, either attached to a separate gear or integrally formed proximate the terminal ends of the at least one drive roller, and whereby the metal plate defines a plurality of apertures sized and shaped to receive the plurality of annularly disposed cogs therein to advance the metal plate along the conveyor assembly.

5. The apparatus of claim 1, wherein the at least one hopper assembly is defined as first and second hopper assemblies, each assembly including an open-ended box disposed between one or more rakes.

6. The apparatus of claim 5, wherein the first hopper assembly distributes a powderized metal and the second hopper assembly distributes silica.

7. The apparatus of claim 1 wherein the plurality of wire feeder assemblies are oriented vertically with a lateral distance between respective wire feeder assemblies of four inches or less.

8. The apparatus of claim 7 wherein the plurality of wire feeder assemblies define a total number of wire feeder assemblies as twenty-four.

9. The apparatus of claim 8, wherein each wire feeder assembly is individually controlled by the electronic control logic, and every other wire feeder assembly is configured for a transverse motion as the metal plate is advanced therebeneath.

10. The apparatus of claim 8, wherein the electronic control logic predetermines wire feeder assembly groups and operates said predetermined assembly groups in sequence.

11. The apparatus of claim 1 further comprising a cooling drum positioned beneath the plurality of wire feeder assemblies.

12. The apparatus of claim 11, wherein the cooling drum is defined as a perforated cylindrical member with one or more spray bar(s) plumbed therein.

13. The apparatus of claim 12, wherein the one or more spray bar(s) are in a fixed position relative to the cooling drum.

14. The apparatus of claim 12, wherein the one or more spray bar(s) rotate with the cooling drum.

15. The apparatus of claim 1 further comprising a cleaner roller configured to crack and remove excess slag from the metal plate and apparatus.

16. The apparatus of claim 1 further comprising a thermal roller to temper a temperature differential between the plurality of wire feeder assemblies and ambient air.

17. The apparatus of claim 1 further comprising a plurality of straightener rollers configured to maintain the metal plate in the straightest possible configuration.

18. The apparatus of claim 17, wherein the plurality of straightener rollers include at least an upper roller biased in a downward position.

19. An apparatus configured to produce fused overlay plates comprising a conveyor assembly configured to receive and transport a metal plate through the apparatus, wherein the conveyor assembly comprises at least one drive roller including a plurality of annularly disposed cogs, either attached to a separate gear or integrally formed proximate the terminal ends of the at least one drive roller, and whereby the metal plate defines a plurality of apertures sized and shaped to receive the plurality of annularly disposed cogs therein to advance the metal plate along the conveyor assembly, at least one hopper assembly configured to distribute a first layer of a media stored within the at least one hopper assembly onto a surface of the metal plate, a plurality of wire feeder assemblies, each wire feeder assembly including a power head, and electronic control logic in communication with the conveyor assembly, the at least one hopper assembly, and the plurality of wire feeder assemblies, whereby the plurality of wire feeder assemblies render molten the media carried by the metal plate, producing a hardened treatment thereon.

20. The apparatus of claim 19, wherein the conveyor assembly further comprises one or more cylindrical rollers rotatably affixed between opposingly oriented frame members and configured so as to accommodate an eight foot by twenty foot metal plate thereon.

21. The apparatus of claim 19, wherein the conveyor assembly further comprises a plurality of legs, each leg including a mounting bracket attached to a powered ram, each leg configured to vertically adjust a height of the conveyor assembly.

22. The apparatus of claim 19 further comprising a ground assembly in communication with the metal plate.

23. The apparatus of claim 22, wherein the ground assembly is defined by a plurality of biased arms, each biased arm in the nature of a leaf spring with a ground shoe attached at opposing longitudinal ends of each biased arm, the ground shoes in contact with the metal plate.

24. The apparatus of claim 19, wherein the at least one hopper assembly is defined as first and second hopper assemblies, each assembly including an open-ended box disposed between one or more rakes.

25. The apparatus of claim 24, wherein the first hopper assembly distributes a powderized metal and the second hopper assembly distributes silica.

26. The apparatus of claim 19, wherein the plurality of wire feeder assemblies are oriented vertically with a lateral distance between respective wire feeder assemblies of four inches or less.

27. The apparatus of claim 26, wherein the plurality of wire feeder assemblies define a total number of wire feeder assemblies as twenty-four.

28. The apparatus of claim 27, wherein each wire feeder assembly is individually controlled by the electronic control logic, and every other wire feeder assembly is configured for a transverse motion as the metal plate is advanced therebeneath.

29. The apparatus of claim 27, wherein the electronic control logic predetermines wire feeder assembly groups and operates said predetermined assembly groups in sequence.

30. The apparatus of claim 19 further comprising a cooling drum positioned beneath the plurality of wire feeder assemblies.

31. The apparatus of claim 30, wherein the cooling drum is defined as a perforated cylindrical member with one or more spray bar(s) plumbed therein.

32. The apparatus of claim 31, wherein the one or more spray bar(s) are in a fixed position relative to the cooling drum.

33. The apparatus of claim 31, wherein the one or more spray bar(s) rotate with the cooling drum.

34. The apparatus of claim 19 further comprising a cleaner roller configured to crack and remove excess slag from the metal plate and apparatus.

35. The apparatus of claim 19 further comprising a thermal roller to temper a temperature differential between the plurality of wire feeder assemblies and ambient air.

36. The apparatus of claim 19 further comprising a plurality of straightener rollers configured to maintain the metal plate in the straightest possible configuration.

37. The apparatus of claim 36, wherein the plurality of straightener rollers include at least an upper roller biased in a downward position.

38. An apparatus configured to produce fused overlay plates comprising
- a conveyor assembly configured to receive and transport a metal plate through the apparatus,
- at least one hopper assembly configured to distribute a first layer of a media stored within the at least one hopper assembly onto a surface of the metal plate, wherein the at least one hopper assembly is defined as first and second hopper assemblies, each assembly including an open-ended box disposed between one or more rakes,
- a plurality of wire feeder assemblies, each wire feeder assembly including a power head, and
- electronic control logic in communication with the conveyor assembly, the at least one hopper assembly, and the plurality of wire feeder assemblies,
- whereby the plurality of wire feeder assemblies render molten the media carried by the metal plate, producing a hardened treatment thereon.

39. The apparatus of claim 38, wherein the conveyor assembly further comprises one or more cylindrical rollers rotatably affixed between opposingly oriented frame members and configured so as to accommodate an eight foot by twenty foot metal plate thereon.

40. The apparatus of claim 38, wherein the conveyor assembly further comprises a plurality of legs, each leg including a mounting bracket attached to a powered ram, each leg configured to vertically adjust a height of the conveyor assembly.

41. The apparatus of claim 38 further comprising a ground assembly in communication with the metal plate.

42. The apparatus of claim 41, wherein the ground assembly is defined by a plurality of biased arms, each biased arm in the nature of a leaf spring with a ground shoe attached at opposing longitudinal ends of each biased arm, the ground shoes in contact with the metal plate.

43. The apparatus of claim 38, wherein the conveyor assembly comprises at least one drive roller including a plurality of annularly disposed cogs, either attached to a separate gear or integrally formed proximate the terminal ends of the at least one drive roller, and whereby the metal plate defines a plurality of apertures sized and shaped to receive the plurality of annularly disposed cogs therein to advance the metal plate along the conveyor assembly.

44. The apparatus of claim 38, wherein the first hopper assembly distributes a powderized metal and the second hopper assembly distributes silica.

45. The apparatus of claim 38, wherein the plurality of wire feeder assemblies are oriented vertically with a lateral distance between respective wire feeder assemblies of four inches or less.

46. The apparatus of claim 45, wherein the plurality of wire feeder assemblies define a total number of wire feeder assemblies as twenty-four.

47. The apparatus of claim 46, wherein each wire feeder assembly is individually controlled by the electronic control logic, and every other wire feeder assembly is configured for a transverse motion as the metal plate is advanced therebeneath.

48. The apparatus of claim 46, wherein the electronic control logic predetermines wire feeder assembly groups and operates said predetermined assembly groups in sequence.

49. The apparatus of claim 38 further comprising a cooling drum positioned beneath the plurality of wire feeder assemblies.

50. The apparatus of claim 49, wherein the cooling drum is defined as a perforated cylindrical member with one or more spray bar(s) plumbed therein.

51. The apparatus of claim 50, wherein the one or more spray bar(s) are in a fixed position relative to the cooling drum.

52. The apparatus of claim 50, wherein the one or more spray bar(s) rotate with the cooling drum.

53. The apparatus of claim 38 further comprising a cleaner roller configured to crack and remove excess slag from the metal plate and apparatus.

54. The apparatus of claim 38 further comprising a thermal roller to temper a temperature differential between the plurality of wire feeder assemblies and ambient air.

55. The apparatus of claim 38 further comprising a plurality of straightener rollers configured to maintain the metal plate in the straightest possible configuration.

56. The apparatus of claim 55, wherein the plurality of straightener rollers include at least an upper roller biased in a downward position.

57. An apparatus configured to produce fused overlay plates comprising
- a conveyor assembly configured to receive and transport a metal plate through the apparatus,
- at least one hopper assembly configured to distribute a first layer of a media stored within the at least one hopper assembly onto a surface of the metal plate, twenty-four wire feeder assemblies, each wire feeder assembly including a power head, wherein each wire feeder assembly is individually controlled by the electronic control logic, and every other wire feeder assembly is configured for a transverse motion as the metal plate is advanced therebeneath, and
- electronic control logic in communication with the conveyor assembly, the at least one hopper assembly, and the plurality of wire feeder assemblies,
- whereby the plurality of wire feeder assemblies render molten the media carried by the metal plate, producing a hardened treatment thereon.

58. The apparatus of claim 57, wherein the conveyor assembly further comprises one or more cylindrical rollers rotatably affixed between opposingly oriented frame members and configured so as to accommodate an eight foot by twenty foot metal plate thereon.

59. The apparatus of claim 57, wherein the conveyor assembly further comprises a plurality of legs, each leg including a mounting bracket attached to a powered ram, each leg configured to vertically adjust a height of the conveyor assembly.

60. The apparatus of claim 57 further comprising a ground assembly in communication with the metal plate.

61. The apparatus of claim 60, wherein the ground assembly is defined by a plurality of biased arms, each biased arm in the nature of a leaf spring with a ground shoe attached at opposing longitudinal ends of each biased arm, the ground shoes in contact with the metal plate.

62. The apparatus of claim 57, wherein the conveyor assembly comprises at least one drive roller including a plurality of annularly disposed cogs, either attached to a separate gear or integrally formed proximate the terminal ends of the at least one drive roller, and whereby the metal plate defines a plurality of apertures sized and shaped to receive the plurality of annularly disposed cogs therein to advance the metal plate along the conveyor assembly.

63. The apparatus of claim 57, wherein the at least one hopper assembly is defined as first and second hopper assemblies, each assembly including an open-ended box disposed between one or more rakes.

64. The apparatus of claim 63, wherein the first hopper assembly distributes a powderized metal and the second hopper assembly distributes silica.

65. The apparatus of claim 57, wherein each of the wire feeder assemblies are oriented vertically with a lateral distance between respective wire feeder assemblies of four inches or less.

66. The apparatus of claim 57, wherein the electronic control logic predetermines wire feeder assembly groups and operates said predetermined assembly groups in sequence.

67. The apparatus of claim 57 further comprising a cooling drum positioned beneath the plurality of wire feeder assemblies.

68. The apparatus of claim 67, wherein the cooling drum is defined as a perforated cylindrical member with one or more spray bar(s) plumbed therein.

69. The apparatus of claim 68, wherein the one or more spray bar(s) are in a fixed position relative to the cooling drum.

70. The apparatus of claim 68, wherein the one or more spray bar(s) rotate with the cooling drum.

71. The apparatus of claim 57 further comprising a cleaner roller configured to crack and remove excess slag from the metal plate and apparatus.

72. The apparatus of claim 57 further comprising a thermal roller to temper a temperature differential between the plurality of wire feeder assemblies and ambient air.

73. The apparatus of claim 57 further comprising a plurality of straightener rollers configured to maintain the metal plate in the straightest possible configuration.

74. The apparatus of claim 73, wherein the plurality of straightener rollers include at least an upper roller biased in a downward position.

75. An apparatus configured to produce fused overlay plates comprising
a conveyor assembly configured to receive and transport a metal plate through the apparatus,
at least one hopper assembly configured to distribute a first layer of a media stored within the at least one hopper assembly onto a surface of the metal plate,
a plurality of wire feeder assemblies, each wire feeder assembly including a power head, and
a cooling drum, wherein the cooling drum is defined as a perforated cylindrical member with one or more spray bar(s) plumbed therein in a fixed position relative to the cooling drum,
electronic control logic in communication with the conveyor assembly, the at least one hopper assembly, and the plurality of wire feeder assemblies,
whereby the plurality of wire feeder assemblies render molten the media carried by the metal plate, producing a hardened treatment thereon.

76. The apparatus of claim 75, wherein the conveyor assembly further comprises one or more cylindrical rollers rotatably affixed between opposingly oriented frame members and configured so as to accommodate an eight foot by twenty foot metal plate thereon.

77. The apparatus of claim 75, wherein the conveyor assembly further comprises a plurality of legs, each leg including a mounting bracket attached to a powered ram, each leg configured to vertically adjust a height of the conveyor assembly.

78. The apparatus of claim 75 further comprising a ground assembly in communication with the metal plate.

79. The apparatus of claim 78, wherein the ground assembly is defined by a plurality of biased arms, each biased arm in the nature of a leaf spring with a ground shoe attached at opposing longitudinal ends of each biased arm, the ground shoes in contact with the metal plate.

80. The apparatus of claim 75, wherein the conveyor assembly comprises at least one drive roller including a plurality of annularly disposed cogs, either attached to a separate gear or integrally formed proximate the terminal ends of the at least one drive roller, and whereby the metal plate defines a plurality of apertures sized and shaped to receive the plurality of annularly disposed cogs therein to advance the metal plate along the conveyor assembly.

81. The apparatus of claim 75, wherein the at least one hopper assembly is defined as first and second hopper assemblies, each assembly including an open-ended box disposed between one or more rakes.

82. The apparatus of claim 81, wherein the first hopper assembly distributes a powderized metal and the second hopper assembly distributes silica.

83. The apparatus of claim 75, wherein the plurality of wire feeder assemblies are oriented vertically with a lateral distance between respective wire feeder assemblies of four inches or less.

84. The apparatus of claim 83, wherein the plurality of wire feeder assemblies define a total number of wire feeder assemblies as twenty-four.

85. The apparatus of claim 84, wherein each wire feeder assembly is individually controlled by the electronic control logic, and every other wire feeder assembly is configured for a transverse motion as the metal plate is advanced therebeneath.

86. The apparatus of claim 84, wherein the electronic control logic predetermines wire feeder assembly groups and operates said predetermined assembly groups in sequence.

87. The apparatus of claim 75, wherein the cooling drum is positioned beneath the plurality of wire feeder assemblies.

88. The apparatus of claim 75, wherein the one or more spray bar(s) rotate with the cooling drum.

89. The apparatus of claim 75 further comprising a cleaner roller configured to crack and remove excess slag from the metal plate and apparatus.

90. The apparatus of claim 75 further comprising a thermal roller to temper a temperature differential between the plurality of wire feeder assemblies and ambient air.

91. The apparatus of claim 75 further comprising a plurality of straightener rollers configured to maintain the metal plate in the straightest possible configuration.

92. The apparatus of claim 91, wherein the plurality of straightener rollers include at least an upper roller biased in a downward position.

93. An apparatus configured to produce fused overlay plates comprising
a conveyor assembly configured to receive and transport a metal plate through the apparatus,
at least one hopper assembly configured to distribute a first layer of a media stored within the at least one hopper assembly onto a surface of the metal plate,
a plurality of wire feeder assemblies, each wire feeder assembly including a power head,
a thermal roller to temper a temperature differential between the plurality of wire feeder assemblies and ambient air, and
electronic control logic in communication with the conveyor assembly, the at least one hopper assembly, and the plurality of wire feeder assemblies,
whereby the plurality of wire feeder assemblies render molten the media carried by the metal plate, producing a hardened treatment thereon.

94. The apparatus of claim 93, wherein the conveyor assembly further comprises one or more cylindrical rollers rotatably affixed between opposingly oriented frame members and configured so as to accommodate an eight foot by twenty foot metal plate thereon.

95. The apparatus of claim 93, wherein the conveyor assembly further comprises a plurality of legs, each leg including a mounting bracket attached to a powered ram, each leg configured to vertically adjust a height of the conveyor assembly.

96. The apparatus of claim 93 further comprising a ground assembly in communication with the metal plate.

97. The apparatus of claim 96, wherein the ground assembly is defined by a plurality of biased arms, each biased arm in the nature of a leaf spring with a ground shoe attached at opposing longitudinal ends of each biased arm, the ground shoes in contact with the metal plate.

98. The apparatus of claim 93, wherein the conveyor assembly comprises at least one drive roller including a plurality of annularly disposed cogs, either attached to a separate gear or integrally formed proximate the terminal ends of the at least one drive roller, and whereby the metal plate defines a plurality of apertures sized and shaped to receive the plurality of annularly disposed cogs therein to advance the metal plate along the conveyor assembly.

99. The apparatus of claim 93, wherein the at least one hopper assembly is defined as first and second hopper assemblies, each assembly including an open-ended box disposed between one or more rakes.

100. The apparatus of claim 99, wherein the first hopper assembly distributes a powderized metal and the second hopper assembly distributes silica.

101. The apparatus of claim 93 wherein the plurality of wire feeder assemblies are oriented vertically with a lateral distance between respective wire feeder assemblies of four inches or less.

102. The apparatus of claim 101, wherein the plurality of wire feeder assemblies define a total number of wire feeder assemblies as twenty-four.

103. The apparatus of claim 102, wherein each wire feeder assembly is individually controlled by the electronic control logic, and every other wire feeder assembly is configured for a transverse motion as the metal plate is advanced therebeneath.

104. The apparatus of claim 102, wherein the electronic control logic predetermines wire feeder assembly groups and operates said predetermined assembly groups in sequence.

105. The apparatus of claim 93 further comprising a cooling drum positioned beneath the plurality of wire feeder assemblies.

106. The apparatus of claim 105, wherein the cooling drum is defined as a perforated cylindrical member with one or more spray bar(s) plumbed therein.

107. The apparatus of claim 106, wherein the one or more spray bar(s) are in a fixed position relative to the cooling drum.

108. The apparatus of claim 106, wherein the one or more spray bar(s) rotate with the cooling drum.

109. The apparatus of claim 93 further comprising a cleaner roller configured to crack and remove excess slag from the metal plate and apparatus.

110. The apparatus of claim 93 further comprising a plurality of straightener rollers configured to maintain the metal plate in the straightest possible configuration.

111. The apparatus of claim 110, wherein the plurality of straightener rollers include at least an upper roller biased in a downward position.

112. An apparatus configured to produce fused overlay plates comprising
a conveyor assembly configured to receive and transport a metal plate through the apparatus,
at least one hopper assembly configured to distribute a first layer of a media stored within the at least one hopper assembly onto a surface of the metal plate,
a plurality of wire feeder assemblies, each wire feeder assembly including a power head,
a plurality of straightener rollers configured to maintain the metal plate in the straightest possible configuration, and
electronic control logic in communication with the conveyor assembly, the at least one hopper assembly, and the plurality of wire feeder assemblies,
whereby the plurality of wire feeder assemblies render molten the media carried by the metal plate, producing a hardened treatment thereon.

113. The apparatus of claim 112, wherein the conveyor assembly further comprises one or more cylindrical rollers rotatably affixed between opposingly oriented frame members and configured so as to accommodate an eight foot by twenty foot metal plate thereon.

114. The apparatus of claim 112, wherein the conveyor assembly further comprises a plurality of legs, each leg including a mounting bracket attached to a powered ram, each leg configured to vertically adjust a height of the conveyor assembly.

115. The apparatus of claim 112 further comprising a ground assembly in communication with the metal plate.

116. The apparatus of claim 115, wherein the ground assembly is defined by a plurality of biased arms, each biased arm in the nature of a leaf spring with a ground shoe attached at opposing longitudinal ends of each biased arm, the ground shoes in contact with the metal plate.

117. The apparatus of claim 112, wherein the conveyor assembly comprises at least one drive roller including a plurality of annularly disposed cogs, either attached to a separate gear or integrally formed proximate the terminal ends of the at least one drive roller, and whereby the metal plate defines a plurality of apertures sized and shaped to receive the plurality of annularly disposed cogs therein to advance the metal plate along the conveyor assembly.

118. The apparatus of claim 112, wherein the at least one hopper assembly is defined as first and second hopper assemblies, each assembly including an open-ended box disposed between one or more rakes.

119. The apparatus of claim 118, wherein the first hopper assembly distributes a powderized metal and the second hopper assembly distributes silica.

120. The apparatus of claim 112, wherein the plurality of wire feeder assemblies are oriented vertically with a lateral distance between respective wire feeder assemblies of four inches or less.

121. The apparatus of claim 120, wherein the plurality of wire feeder assemblies define a total number of wire feeder assemblies as twenty-four.

122. The apparatus of claim 121, wherein each wire feeder assembly is individually controlled by the electronic control logic, and every other wire feeder assembly is configured for a transverse motion as the metal plate is advanced therebeneath.

123. The apparatus of claim 121, wherein the electronic control logic predetermines wire feeder assembly groups and operates said predetermined assembly groups in sequence.

124. The apparatus of claim 112 further comprising a cooling drum positioned beneath the plurality of wire feeder assemblies.

125. The apparatus of claim 124, wherein the cooling drum is defined as a perforated cylindrical member with one or more spray bar(s) plumbed therein.

126. The apparatus of claim 125, wherein the one or more spray bar(s) are in a fixed position relative to the cooling drum.

127. The apparatus of claim 125, wherein the one or more spray bar(s) rotate with the cooling drum.

128. The apparatus of claim 112 further comprising a cleaner roller configured to crack and remove excess slag from the metal plate and apparatus.

129. The apparatus of claim 112 further comprising a thermal roller to temper a temperature differential between the plurality of wire feeder assemblies and ambient air.

130. The apparatus of claim 112, wherein the plurality of straightener rollers include at least an upper roller biased in a downward position.

* * * * *